US012759773B2

(12) United States Patent
Raymus

(10) Patent No.: US 12,759,773 B2
(45) Date of Patent: Oct. 13, 2026

(54) PHONE HOLDER INCORPORATED WITH A BEVERAGE BOTTLE

(71) Applicant: Thomas Anthony Raymus, Manteca, CA (US)

(72) Inventor: Thomas Anthony Raymus, Manteca, CA (US)

( * ) Notice: Subject to any disclaimer, the term of this patent is extended or adjusted under 35 U.S.C. 154(b) by 183 days.

(21) Appl. No.: 18/422,139

(22) Filed: Jan. 25, 2024

(65) Prior Publication Data

US 2025/0214756 A1 Jul. 3, 2025

Related U.S. Application Data

(63) Continuation-in-part of application No. 18/399,631, filed on Dec. 28, 2023, now Pat. No. 12,365,522.

(51) Int. Cl.
*B65D 51/24* (2006.01)
*B65D 23/10* (2006.01)
(Continued)

(52) U.S. Cl.
CPC ............ *B65D 51/24* (2013.01); *B65D 23/10* (2013.01); *B65D 23/12* (2013.01);
(Continued)

(58) Field of Classification Search
CPC .... B65D 43/02; B65D 53/02; B65D 47/0857; B65D 25/2811; B65D 25/20; B65D 51/24; A47G 19/2272; A47G 19/22; H04M 1/04
(Continued)

(56) References Cited

U.S. PATENT DOCUMENTS

D140,862 S 4/1945 Conlan
4,068,668 A * 1/1978 Moore .................. A44C 7/001 124/37

(Continued)

FOREIGN PATENT DOCUMENTS

AU 2019206105 2/2020
CA 3123284 A1 * 1/2022 ............ A47G 19/22

(Continued)

OTHER PUBLICATIONS

HYDROBUDDY—Water Bottle Phone Holder for Fitness Bottle—Phone Holding Sleeve for Workout and Running—Water Bottle Phone Storage—https://www.amazon.com/HYDROBUDDY-Fitness-Holding-Workout-Running/dp/B08WR7QCW3 (accessed Jan. 29, 2024).

(Continued)

*Primary Examiner* — Nathan J Jenness
*Assistant Examiner* — Madison L Poos
(74) *Attorney, Agent, or Firm* — Boris Leschinsky

(57) ABSTRACT

The phone holder of the invention may be attached to or incorporated with a part of a beverage bottle. In embodiments, the part of the beverage bottle may be one of the following: a rigid carry loop attached to or incorporated with a lid, wherein the lid is configured to seal the mouth of the beverage bottle; a flip cap associated with the lid; a side handle attached to or incorporated with the beverage bottle; or a lid handle extending across a top of the lid. Retaining the phone by using the beverage bottle has a number of advantages as compared to conventional phone stands, including a higher elevation for viewing the screen and for taking selfies, better stability, elimination of a need to carry around a separate phone stand, etc.

7 Claims, 35 Drawing Sheets

(51) Int. Cl.

| | |
|---|---|
| ***B65D 23/12*** | (2006.01) |
| ***B65D 43/02*** | (2006.01) |
| ***B65D 47/08*** | (2006.01) |
| ***B65D 51/18*** | (2006.01) |
| ***H04M 1/04*** | (2006.01) |

(52) U.S. Cl.
CPC ......... *B65D 43/0202* (2013.01); *B65D 47/08* (2013.01); *B65D 51/18* (2013.01); *H04M 1/04* (2013.01); *B65D 2543/00824* (2013.01)

(58) Field of Classification Search
USPC .............................. 215/228; 220/212.5, 212
See application file for complete search history.

(56) References Cited

U.S. PATENT DOCUMENTS

| | | | | | |
|---|---|---|---|---|---|
| 6,092,647 | A * | 7/2000 | Yeh | | F23Q 2/32 206/217 |
| D510,235 | S | 10/2005 | Sorensen | | |
| D666,047 | S | 8/2012 | Lin | | |
| 8,381,935 | B1 | 2/2013 | Buck | | |
| D827,405 | S | 9/2018 | Chun | | |
| 10,165,877 | B2 | 1/2019 | Sorensen | | |
| 10,421,593 | B1 | 9/2019 | Litten | | |
| D886,094 | S | 6/2020 | Xu | | |
| 11,597,097 | B2 | 3/2023 | Riedel | | |
| 11,759,035 | B2 | 9/2023 | Aldous | | |
| 2002/0170915 | A1 | 11/2002 | Hierzer | | |
| 2005/0040052 | A1 | 2/2005 | Dixon | | |
| 2006/0180585 | A1 | 8/2006 | Cunningham | | |
| 2017/0050785 | A1 | 2/2017 | Roth | | |
| 2017/0136960 | A1* | 5/2017 | Kim | | F16M 13/022 |
| 2017/0174382 | A1 | 6/2017 | Korfonta | | |
| 2019/0018452 | A1* | 1/2019 | Caron | | F16M 13/00 |
| 2019/0166976 | A1 | 6/2019 | Croix | | |
| 2021/0212485 | A1 | 7/2021 | Attar | | |
| 2022/0297899 | A1 | 9/2022 | Raymus | | |
| 2023/0099050 | A1* | 3/2023 | Fan | | H04B 1/3883 248/122.1 |
| 2023/0403352 | A1* | 12/2023 | Alves | | B65D 1/0207 |

FOREIGN PATENT DOCUMENTS

| | | | | | |
|---|---|---|---|---|---|
| CN | 203673961 | U | | 6/2014 | |
| CN | 204341717 | U | | 5/2015 | |
| CN | 206395128 | U | | 8/2017 | |
| CN | 207677942 | U | | 7/2018 | |
| CN | 111917909 | A | * | 11/2020 | H02J 7/731 |
| CN | 217428185 | U | | 9/2022 | |
| CN | 217714384 | U | * | 11/2022 | H04B 1/3877 |
| DE | 202023105647 | U1 | * | 10/2023 | H04M 1/04 |
| GB | 2521895 | A | | 12/2015 | |
| GB | 2624107 | A | * | 5/2024 | F16M 13/022 |
| KR | 100706717 | B1 | | 12/2007 | |
| KR | 200474217 | Y1 | * | 8/2014 | H04M 1/04 |
| KR | 20170097919 | | | 8/2017 | |
| KR | 102369204 | | | 2/2022 | |
| TW | M607275 | U | | 2/2021 | |
| TW | M643542 | U | | 7/2023 | |

OTHER PUBLICATIONS

32oz Insulated Steel Bottle with Magnetic Phone Mount for Shooting Video or Pictures—https://www.etsy.com/listing/1469034183/32oz-insulated-steel-bottle-with?amp%3B=&amp%3Bgad_source=1&amp%3Bgao=1&amp% 3Bgclid=Cj0KCQiA2KitBhCIARIsAPPMEhLznDRWKAXOyf8MiWSCgCabewyJi3Sz-5f3rb7HL_b7VgoKm-suNhgaAqGMEALw_wcB&amp%3Butm_campaign=shopping_us_b-home_and_living-kitchen_and_dining-drink_and_barware-drinkware-other&amp%.

AINOPE for MagSafe Water Bottle 24oz Magnetic Stainless Steel Gym Bottles for Men, Women & Kids Double Walled, Insulated Thermos Coldest Water Bottle for iPhone 15 Pro Max Sports Bottle Accessories—https://www.amazon.com/AINOPE-Magnetic-Stainless-Insulated-Accessories/dp/B0CFR152CV/ref%3Dsr_1_5?amp%3Bdib=eyJ2ljoiMSJ9.DU-qCc_ITeVi9GdhBzmM4KrtC1B6p2aP2MxGVO015bFIHncY-zeVRQ4IUL_XQTTs8dFUw1E8O_Rxqg818GHpNdgkaQv7RZ2yjB8792PxN1iiSFURLs8AApwzgtiTB94Bd4Wxk3L7obU.

RhinoShield 27oz Magnetic Leakproof Water Bottle with Straw Lid, MagSafe Handle and Adjustable Tripod - https:// www.amazon.com/RhinoShield-Magnetic-Leakproof-MagSafe-Adjustable/dp/B0CC895TF3/ref% 3Dci_mcx_psdc_9630569011_t1_BOCFR152CV?th=1 (accessed Jan. 29, 2024).

WeatherTech CupFone—https://www.amazon.com/WeatherTech-CupFone-Universal-Adjustable-Portable/dp/B07KY1XKRQ/ref%3Dpd_ci_mcx_mh_mcx_views_1?amp%3Bcontent-id=amzn1.sym.225b4624-972d-4629-9040-f1bf9923dd95%3Aamzn1.symc.40e6a10e-cbc4-4fa5-81e3-4435ff64d03b&amp%3Bpd_rd_i=B07KY1XKRQ&amp%3Bpd_rd_r=65dddf41-6b3e-4201-8825-c05d7d4d3cc4&amp%3Bpd_rd_wg=knl5f&amp%3Bpf_rd_p=225b4624-972d-4629-9040-f1bf9923dd95&amp%.

APPS2Car Solid Cup Holder Phone Mount—https://www.amazon.com/Holder-Universal-Adjustable-Compatible-Samsung/dp/B08D9K56KB/ref%3Dsxin_15_pa_sp_search_thematic_sspa?amp%3Bcrid=S412U14AX3A6&amp%3Bcv_ct_cx=cup+phone+holder+car&amp%3Bdib=eyJ2ljoiMSJ9.F9NJH8nVrL -_3zK0HnCVsTvYz-LbrM2gN_J82qlzcMZg7KXX8kEXYDO8EZ4Ddd5cXyaSBiYZglhkySTZBq-CgA.s8jmcRRIT75syDe-cXNQdd9ljao_7ukxTvHelpOkpvQ&amp%3Bdib_tag=se&amp%3Bkeywords=cup+phone+holder+car&amp%.

G-B Stanley Cup 40 oz Tumbler Chapstick Keychain Holder—https://www.amazon.com/dp/B0BVGX4KX7?amp%3Bascsubtag=%5Bartid%7C2164.g.43993246%5Bsrc%7Cwww.google.com%5Bch%7C%5Blt%7Cpsv%5Bpid%7C88c17cef-7cf6-4941-b10c-dbc3d6d6ced6&amp%3Btag=pioneerwoman-auto-append-20&amp%3Bth=1&linkCode=ogi&th=1 (accessed Jan. 29, 2024).

MEETI Snack Bowl for Stanley Cup, Reusable Snack Ring Compatible with Stanley Quencher—https://www.amazon.com/MEETI-Reusable-Compatible-Quencher-Accessories/dp/B0CCNSSRYR?th=1 (accessed Jan. 29, 2024).

* cited by examiner

PHONE HOLDER INCORPORATED WITH A BEVERAGE BOTTLE

CROSS-REFERENCE DATA

This patent application is a continuation-in-part and claims a priority date benefit from a co-pending U.S. patent application Ser. No. 18/399,631, filed 28 Dec. 2023 and entitled "A liquid container with a universal adapter and accessories therefor," which in turn claims a priority date benefit from the following provisional patent applications by the same inventor a. U.S. Provisional Patent Application No. 63/465,588 filed 11 May 2023 entitled "Modular container accessory system"
b. U.S. Provisional Patent Application No. 63/468,972 filed 25 May 2023, also entitled "Modular container accessory system"
c. U.S. Provisional Patent Application No. 63/532,186 filed 11 Aug. 2023 entitled "Smartphone holder and stand accessory for use with a water bottle"
d. U.S. Provisional Patent Application No. 63/538,947 filed 18 Sep. 2023 entitled "Stackable funnel container for use with a beverage bottle," and
e. U.S. Provisional Patent Application No. 63/543,323 filed 10 Oct. 2023 entitled "Water bottle handle with a smartphone stand."

All these patent documents are incorporated herein by reference in their respective entireties.

BACKGROUND

Without limiting the scope of the invention, its background is described in connection with beverage bottles. More particularly, the invention describes a phone holder incorporated with a beverage bottle, in particular, with a reusable beverage bottle.

Beverage bottles, such as water bottles, are widely used as a convenient and portable means of carrying and consuming water or other fluids on the go. From daily commutes and outdoor activities to sports events and travel, people rely on water bottles to stay hydrated throughout the day. Their popularity is driven by their practicality, eco-friendliness (in the case of reusable bottles), and the growing awareness of the importance of drinking enough water for overall health and well-being. With a variety of materials, sizes, and designs available, water bottles have become a ubiquitous accessory in modern lifestyles, promoting a more sustainable and healthier hydration habit for people around the world.

Another commonly used and ubiquitous item that a consumer carries around during the day is a smartphone. Hands-free use of a smartphone is convenient when watching a video, listening to music, participating in a long call or a meeting, and in other circumstances of prolonged use when holding a phone with one hand for an extended period of time is tiresome and limits the activities of a user. Frequently, the phone is used in a hand-free manner when the user needs to retain the phone reasonably close to themselves while not holding the phone in a hand, especially during a prolonged conversation. Additionally, taking a video or a photo selfie requires a phone to be retained by another item in a stable position while the user poses in front of the phone's camera. A phone stand and/or holder is usually used in these circumstances. However, carrying a phone stand everywhere is not convenient. A phone stand that is small and convenient to carry is therefore required to address this difficulty and facilitate hands-free operation of the phone on short notice and without having to plan it in advance and anticipate taking a conventional phone stand to be carried around by the user.

A variety of phone stands and holders are known in the prior art. In most cases, these devices include an upper part for attaching to a phone and a lower part acting as a base. The base is typically larger than the footprint of a phone in order to make the phone stand stable in operation. Another way to stabilize the phone is to make the lower base heavy so as to lower the center of gravity of the phone stand assembly. As a result, these devices are frequently bigger and heavier than the phone itself, making them cumbersome to use, especially when traveling.

Since both smartphones and beverage bottles are used by so many people, there is a frequent need to carry both of them around. Adding a phone stand as a third item is not as convenient as it increases the size and weight of everything that the user needs to move along. The need exists, therefore, for a better way to provide a hands-free phone experience for a user when operating a phone for an extended period of time.

SUMMARY

Accordingly, it is an object of the present invention to overcome these and other drawbacks of the prior art by providing a novel beverage bottle with a phone holder incorporated with or attached to one of the parts thereof.

It is another object of the present invention to provide a novel beverage bottle, allowing retention of a smartphone thereon and facilitating hands-free use thereof.

It is a further object of the present invention to provide a beverage bottle serving as a phone stand when such use is required.

The phone holder of the invention may be attached to or incorporated with a part of a beverage bottle. In embodiments, the part of the beverage bottle may be one of the following: a rigid carry loop attached to or incorporated with a lid, wherein the lid is configured to seal the mouth of the beverage bottle; a flip cap associated with the lid; a side handle attached to or incorporated with the beverage bottle; or a lid handle extending across a top of the lid. The phone holder may include a U-shaped channel with a rear wall spaced away from a front wall by a bottom support surface and sized to removably accept a smartphone placed therein and facilitate a hands-free use thereof.

In embodiments, the rigid carry loop may include two parallel arms rotatably attached to the lid and a connecting bar extending across the lid between thereof. The connecting bar may include an elongated slot sized to accept the rear wall of the U-shaped channel therein. In other embodiments, the rear wall and the front wall of the phone holder may extend upward from the flip cap when the flip cap is in a closed position.

Furthermore, the side handle may be generally C-shaped and define a generally horizontal upper portion attached to the beverage bottle at one end thereof. The phone holder may be incorporated with the upper portion and extends upward therefrom.

In other embodiments, the front wall of the phone holder may be slidingly movable across the bottom support surface toward and away from the rear wall as defined by an adjustment screw threadedly attached to a base wall extending from the bottom support surface outside the U-shaped channel.

In other embodiments, the phone holder may include a bar integrally formed therewith and positioned to be parallel with and spaced apart from the bottom support surface. The upper handle portion may include an opening sized to accept the bar of the phone holder therein, thereby retaining the phone holder at the upper handle portion of the side handle.

Furthermore, in other embodiments, the phone holder may include a spring-loaded pivot arm rotatably attached to the upper handle portion in a normally closed position. Pulling the pivot arm away from the upper handle portion and against a spring may open up a channel sized to accept the smartphone therein. The spring may be incorporated within the upper handle portion of the side handle of the beverage bottle.

In other embodiments, the phone holder may include a spring-loaded trigger incorporated with the side handle of the beverage bottle and configured, upon pulling thereon, to move the front wall of the phone holder away from the rear wall thereof. This action may be used to open the U-shaped channel for positioning the smartphone therein.

Finally, the phone holder may feature the U-shaped channel as a cutout in the lid cover.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF PREFERRED EMBODIMENTS OF THE INVENTION

Figure 2:
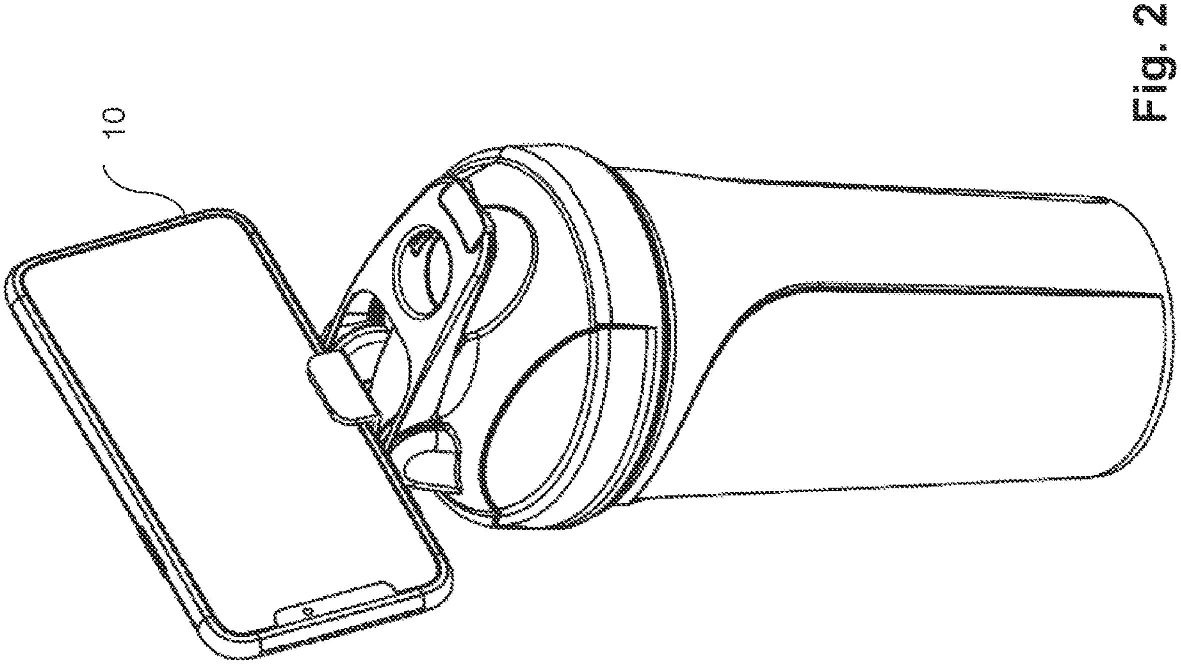
FIG. 2 is a perspective top view of the same.
Figure 1:
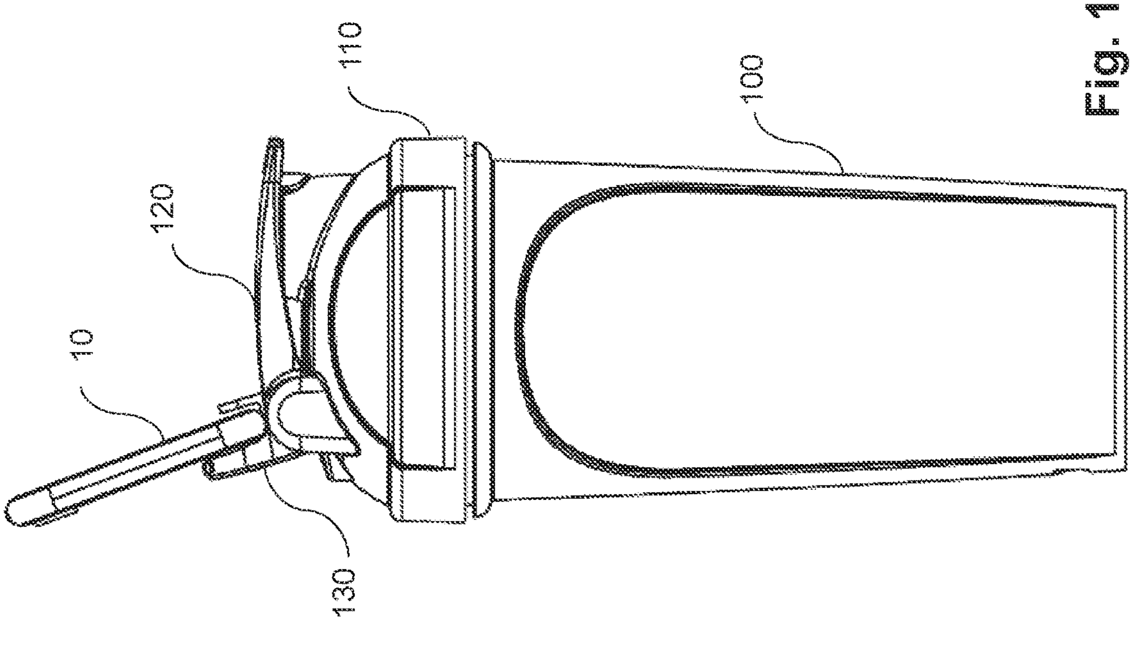
FIG. 1 is a side view of a water bottle with a phone holder incorporated into a carrying loop thereof.
Figure 4:
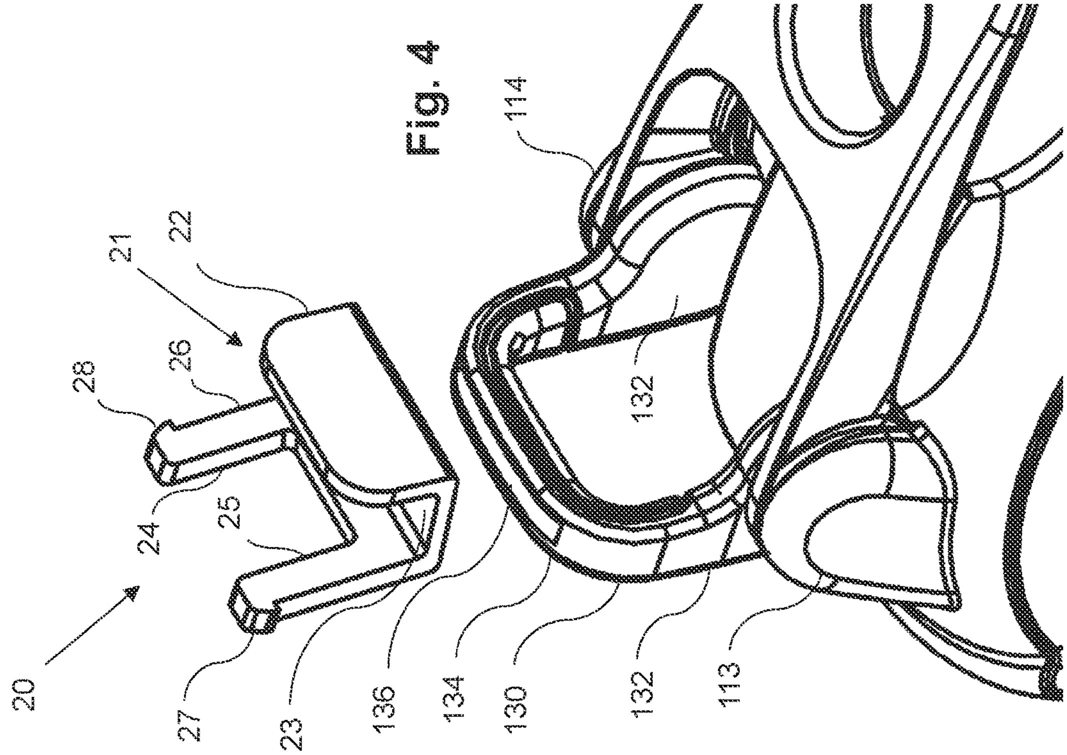
FIG. 4 is a perspective exploded close-up view of the phone holder components of the same.
Figure 3:
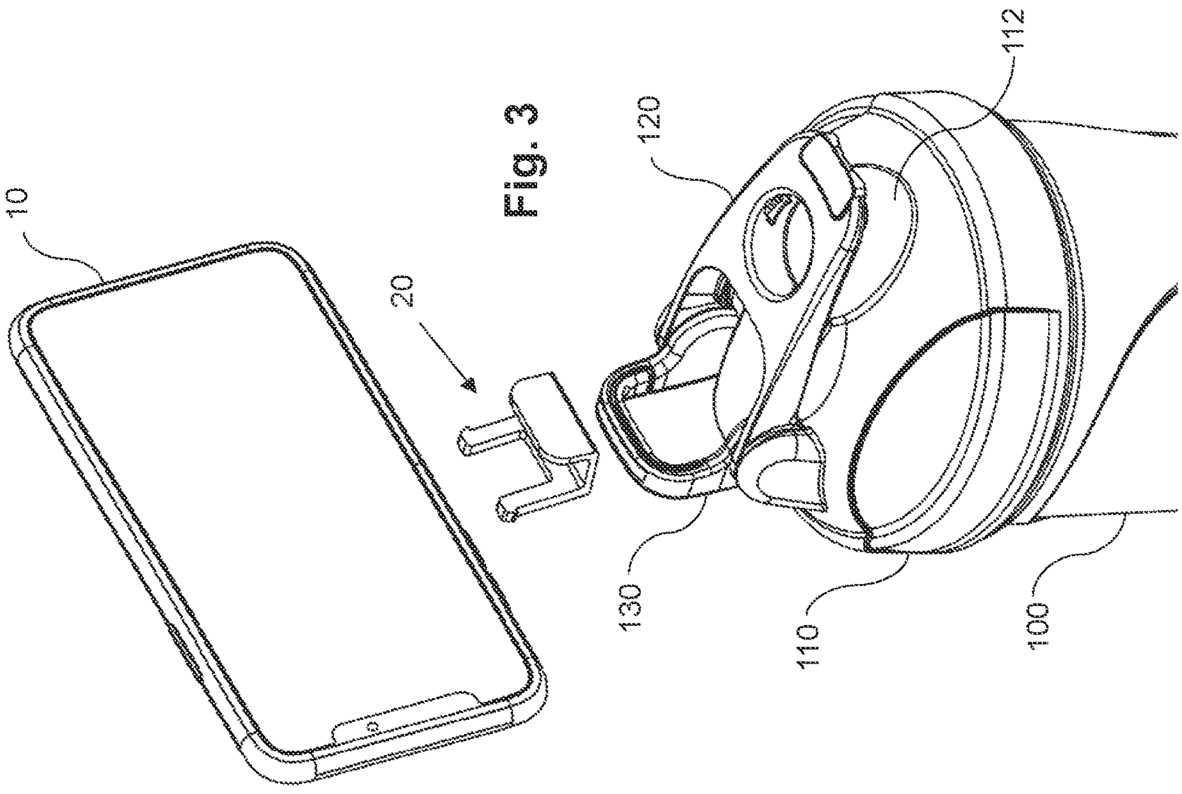
FIG. 3 is a perspective exploded close-up view of the same.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The term "smartphone" and the term "phone" are used interchangeably and generally describe a rectangular-shaped smartphone or a computer tablet. As smartphones and tablets come in slightly different shapes, including variations in length, width, and thickness, the phone holder of the invention may be configured to accommodate such differences, as explained in greater detail below.

The present invention primarily describes using a water bottle itself and components thereof as a base for a phone holder. The phone holder may be incorporated with or attached to a bottle cap, bottle handle, or other parts of the top or the side of the beverage bottle and configured to retain a phone in a horizontal or vertical orientation facilitating the hands-free use thereof.

The term "beverage bottle" is used herein to describe any liquid container, and in particular, a reusable liquid container that may generally include an elongated upright body 100, and a lid 110 to sealingly close off a mouth in the elongated body 100. The lid 110 may have a lid mouth 112 to allow access to the beverage inside the elongated body 100. The lid 110 may have a flip cap 120 configured to close off and seal the bottle mouth and a carry loop 130 to facilitate lifting and carrying around the beverage bottle. In other embodiments, the lid 110 may have another cap arrangement to provide access to the bottle mouth. The beverage bottle may further have a side handle 140 or a top handle 150 incorporated into the lid 110, as explained below in greater detail.

The beverage bottle and its components may be made from known food-grade polymers, composites, and other suitable materials, as the invention is not limited in this regard. Metal brackets, springs, and other supporting elements may also be incorporated into the beverage bottle, as can be appreciated by those skilled in the art.

Smartphone Holder on a Rigid Carry Loop of the Beverage Bottle

FIGS. 1-7 show a first embodiment of the invention in which the rigid carry loop 130 of the beverage bottle has two parallel arms 132 rotatably attached to the lid 110 and a connecting bar 134 extending across the two arms 132 and connecting them together. The connecting bar 134 may have an elongated slot 136 made therein.

A phone holder 20 may include a U-shaped channel 21 formed between a front wall 22, a bottom support surface 23, and a back wall 24. The rear wall 24 and the front wall 22 of the phone holder 20 may extend generally upward. The back wall 24 may include two back arms, 25 and 26, each equipped at the free end with a retention anchor 27 and 28 facing away from each other. The bottom support surface 23 may have a width, measured as a distance between the front wall 22 and the rear wall 24, sufficient to accommodate a variety of commonly used smartphones within the U-shaped channel 21, including those having a protective jacket over them. In embodiments, the width of the bottom support surface 23 may range between about 0.25 inch and 0.65 inch. The length of the bottom support surface 23 from one end to the other end thereof may be sufficient to allow the smartphone placed in the U-shaped channel to remain therein with reasonable stability. In embodiments, the length of the bottom support surface 23 may be in a range from about 0.5 inches to about 1.5 inches. The length of the bottom support surface 23 may also be limited by the width of the carry loop 130 and the length of the elongated slot 136.

Assembly of the phone holder 20 with the carry loop 130 is accomplished by sliding the arms 25 and 26 within the elongated slot 136 from within the space defined by the carry loop 130. Once the retention anchors 27 and 28 emerge from the elongated slot 136 and spring outwards, the phone holder 20 is secured to the carry loop 130—as seen in FIG. 5.

Figure 6:
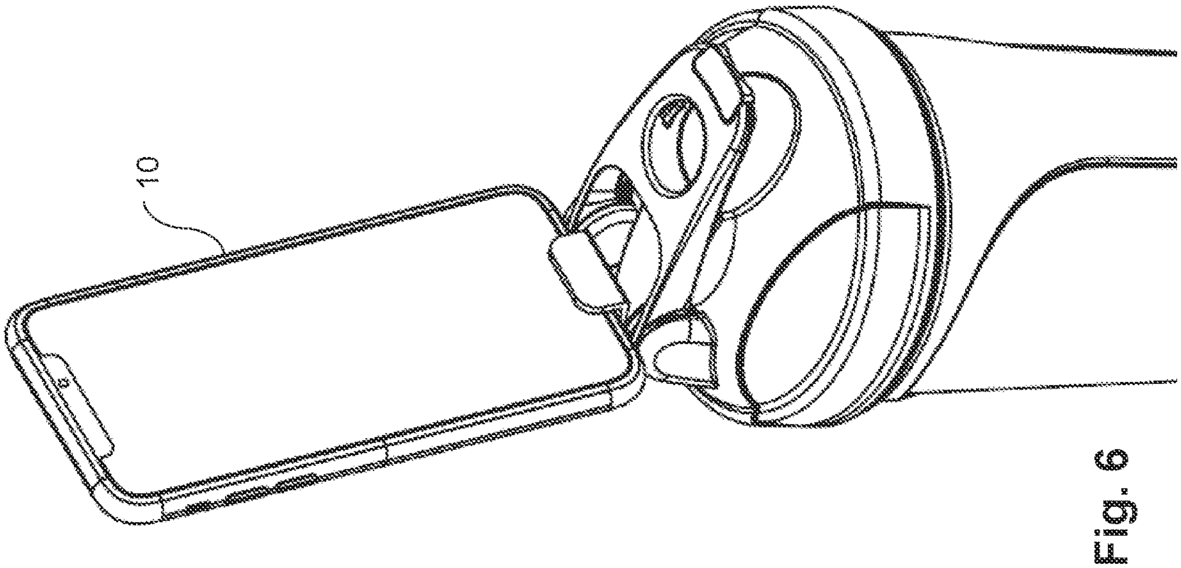
FIG. 6 is a perspective view of the smartphone retained in the phone holder of the same in a vertical orientation.
Figure 5:
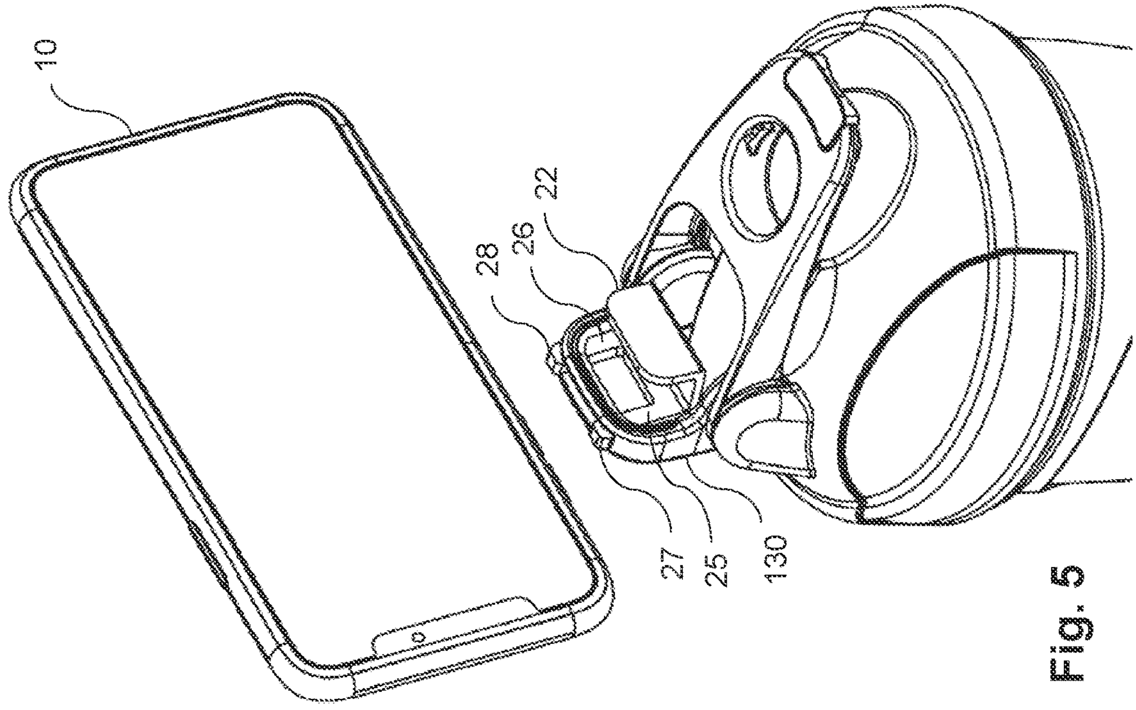
FIG. 5 is a perspective view of the smartphone approaching the phone holder of the same.

Positioning of the smartphone 10 into the phone holder 20 may be accomplished in a horizontal orientation, as seen in FIG. 2 and FIG. 5, or in a vertical orientation, as seen in FIG. 6. As the carry loop 130 may rotate about the axis of rotation defined by two axis protrusions 113 and 114 of the elongated body 100, the viewing angle of the phone retained in the phone holder 20 may be adjusted as desired by the user. The carry loop 130 may be configured to rotate about its axis of rotation with some effort, so that, when placed in a desired position, the smartphone 10 is retained by itself within the phone holder 20 and does not fall out of the freely rotating carry loop 130.

Figure 7:
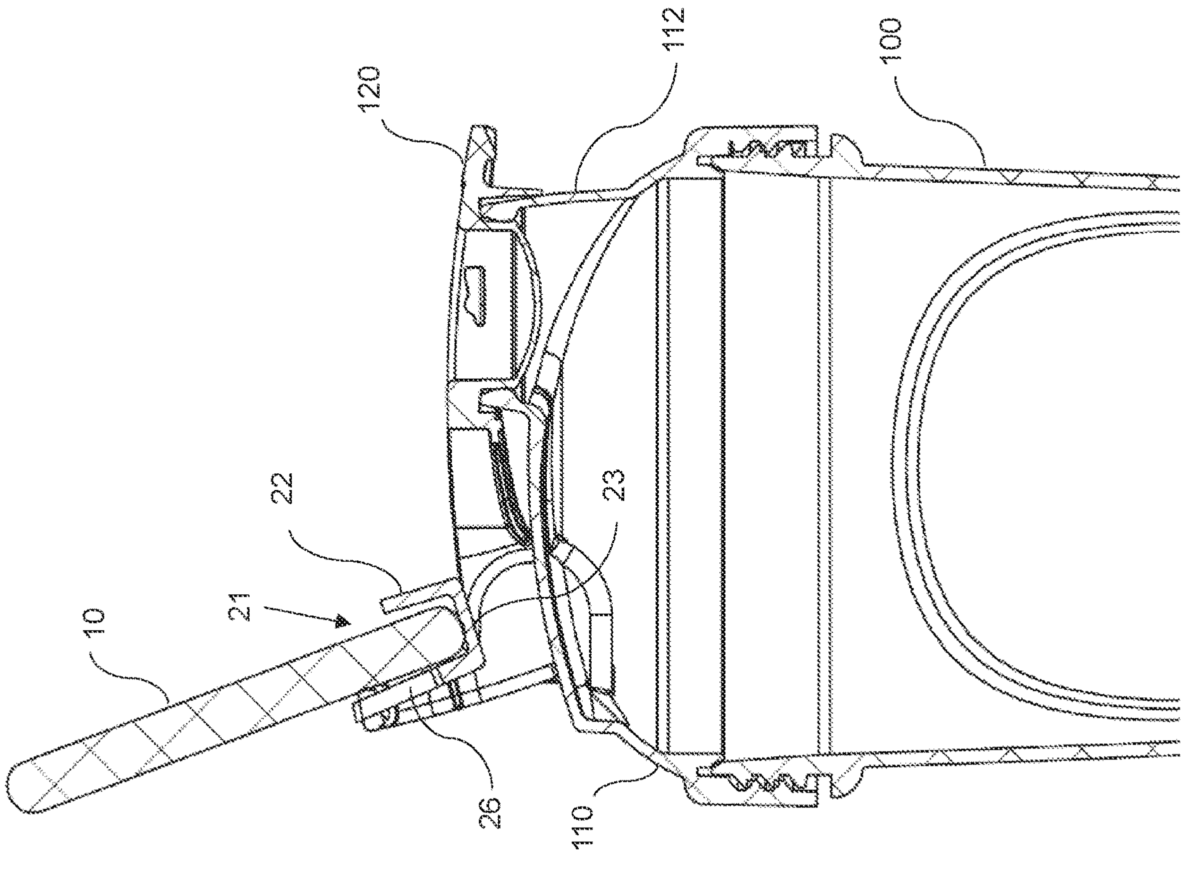
FIG. 7 is a cross-sectional side view of the same.

FIG. 7 shows a cross-sectional view with further details of the phone holder 20 retained in the carry loop 130 and the smartphone 10 retained therein. The height of the back wall 24 and the front wall 22 may be selected to allow insertion of the phone holder through the elongated slot 136 and, at the same time, a reliable retention of the phone 10 within the U-shaped channel 21.

As can be appreciated by those skilled in the art, instead of a removable phone holder design described above, a similar configuration of the phone holder fully integrated with the carry loop 130 as a single body is also contemplated by the present invention and falls within the scope of the claims presented further below.

The design of the phone holder 20 described above has a fixed width of the U-shaped channel. As described below for other phone holder embodiments, the phone holder 20 may also be made to have an adjustable width of the U-shaped channel, so as to provide for a stronger retention of various smartphones having slightly different thicknesses between the rear wall and the front wall of the U-shaped channel. Such designs are also contemplated to be within the scope of the present invention.

Smartphone Holder in a Flip Cap of the Beverage Bottle Lid

Figure 9:
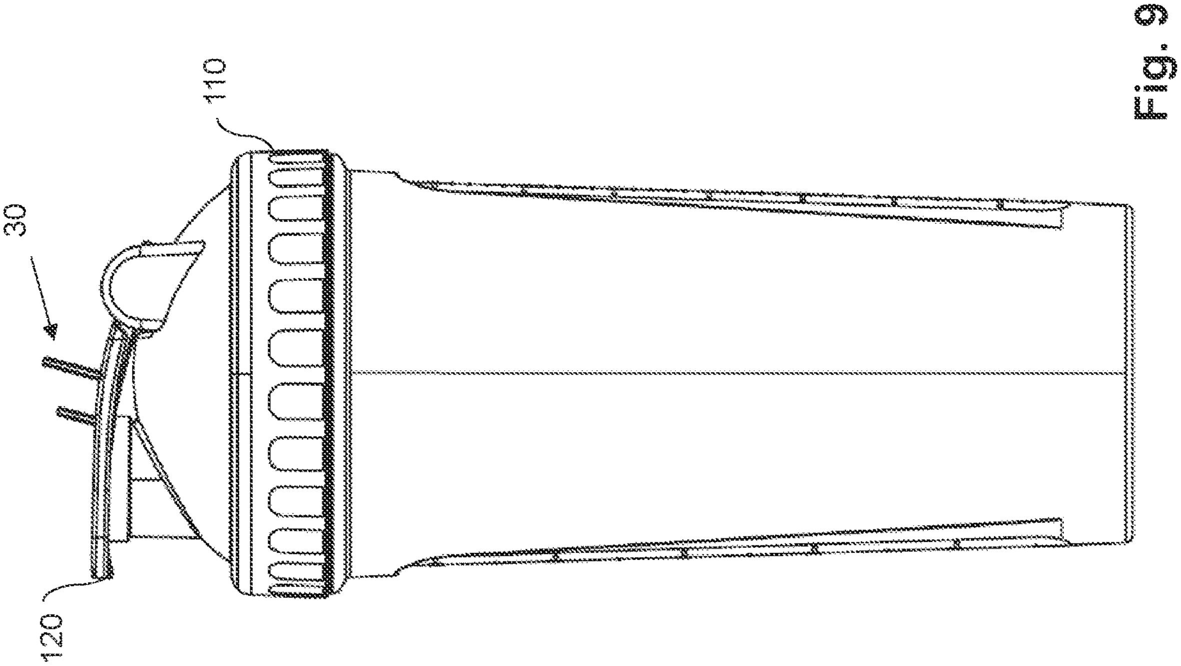
FIG. 9 is a side view of the same.
Figure 8:
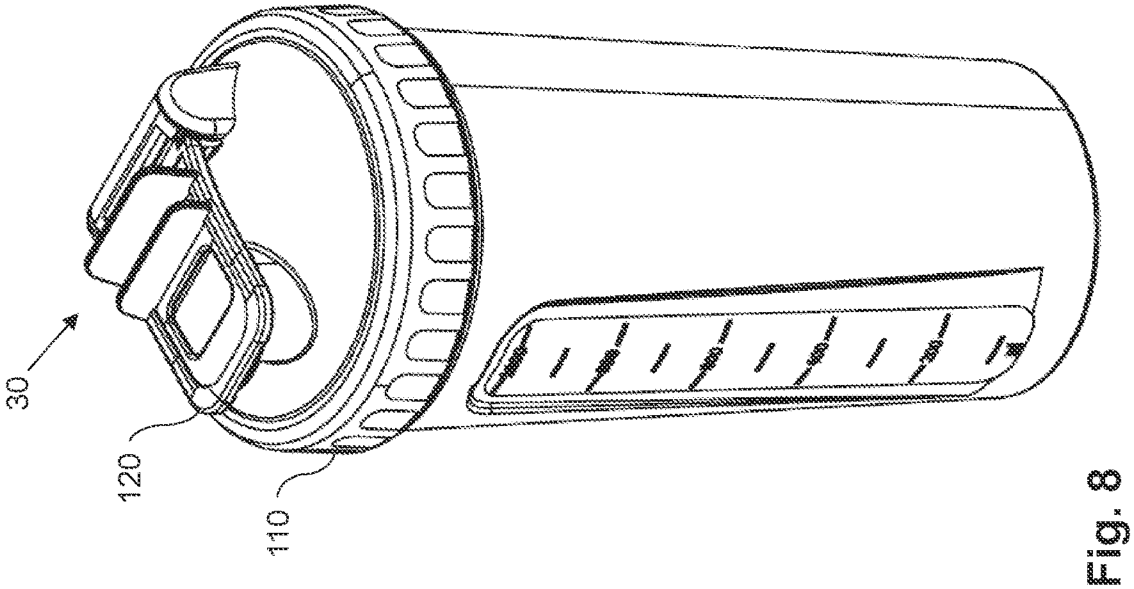
FIG. 8 is a perspective top view of another embodiment with the phone holder built into a flip cap of a beverage bottle.
Figure 12:
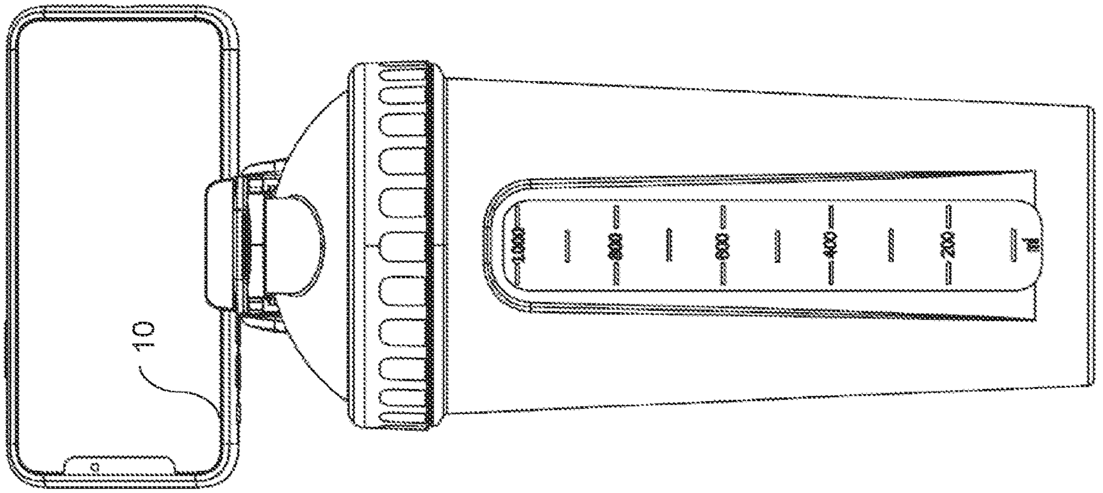
FIG. 12 is a front view of the same as in FIG. 10.
Figure 11:
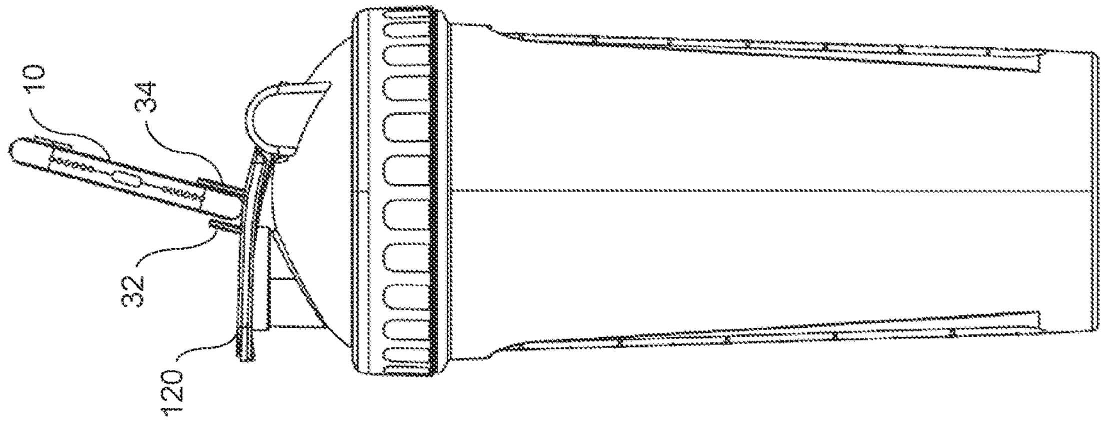
FIG. 11 is a side view of the same as in FIG. 10.
Figure 10:
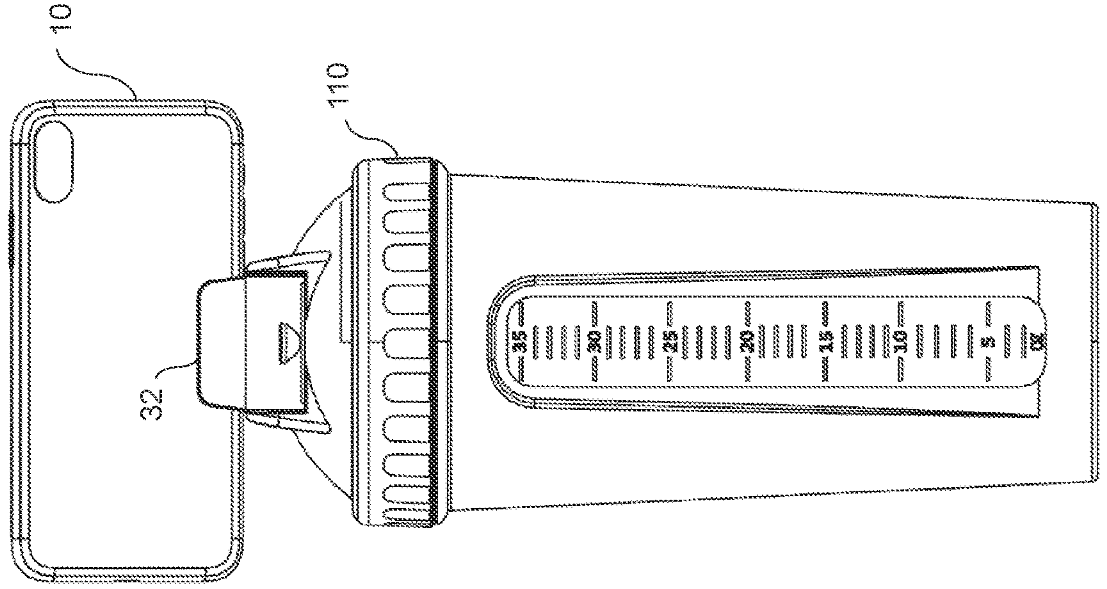
FIG. 10 is a rear view of the same with a smartphone retained therein.
Figure 14:
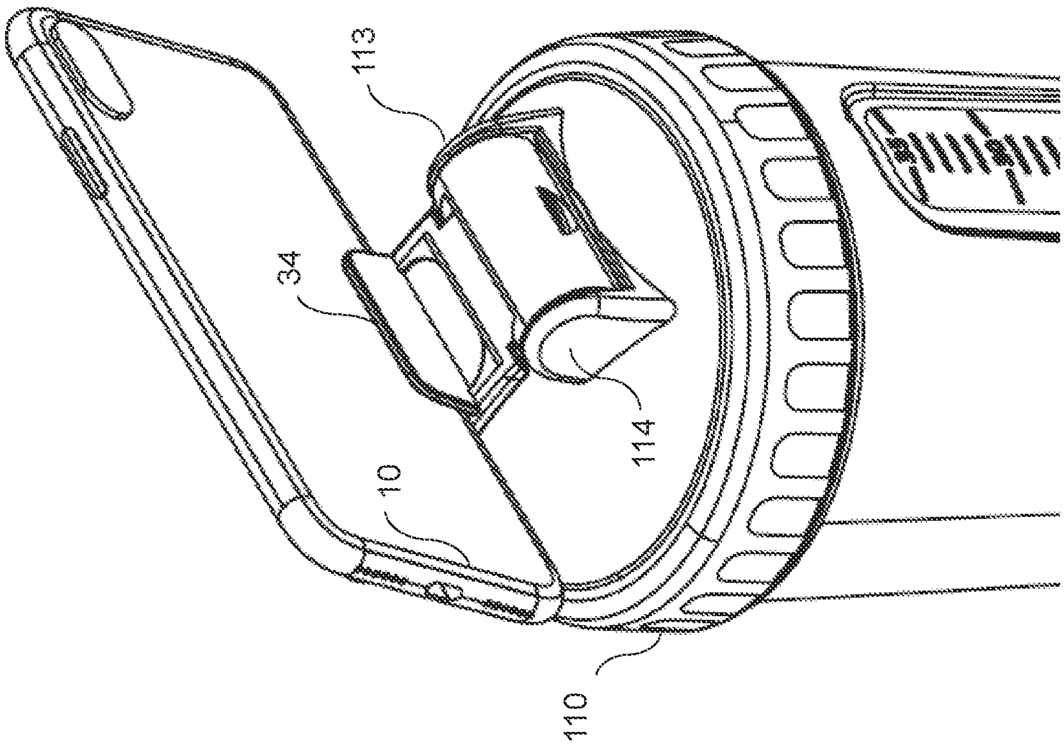
FIG. 14 is a second perspective close-up view of the same as in FIG. 10.
Figure 13:
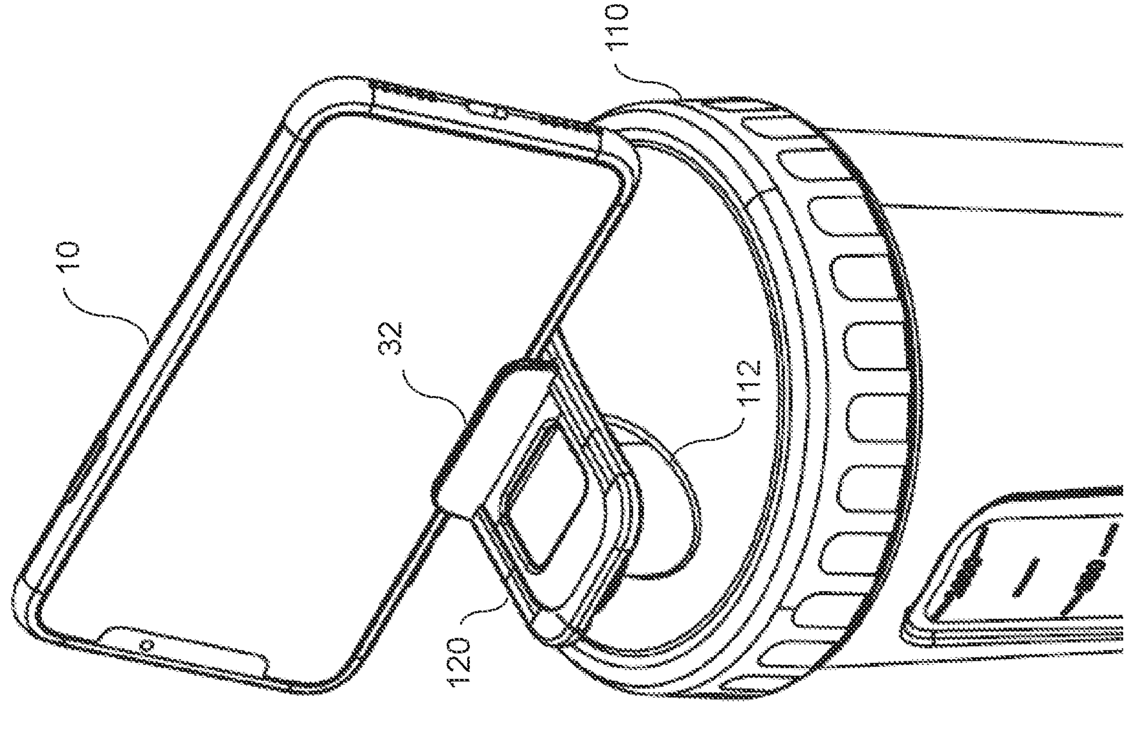
FIG. 13 is a first perspective close-up view of the same as in FIG. 10.
Figure 15:
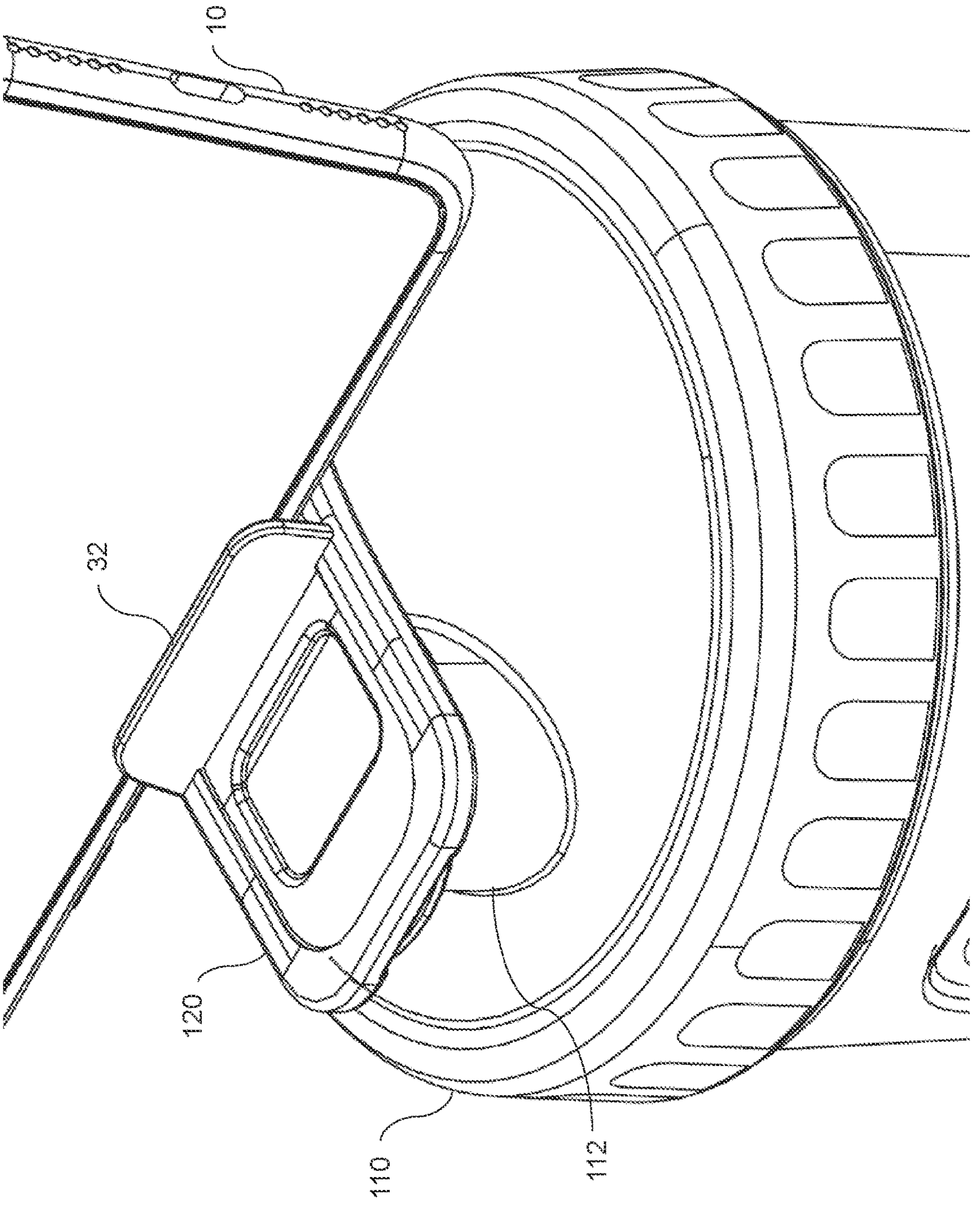
FIG. 15 is a close-up view of the same as in FIG. 13.
Figure 16:
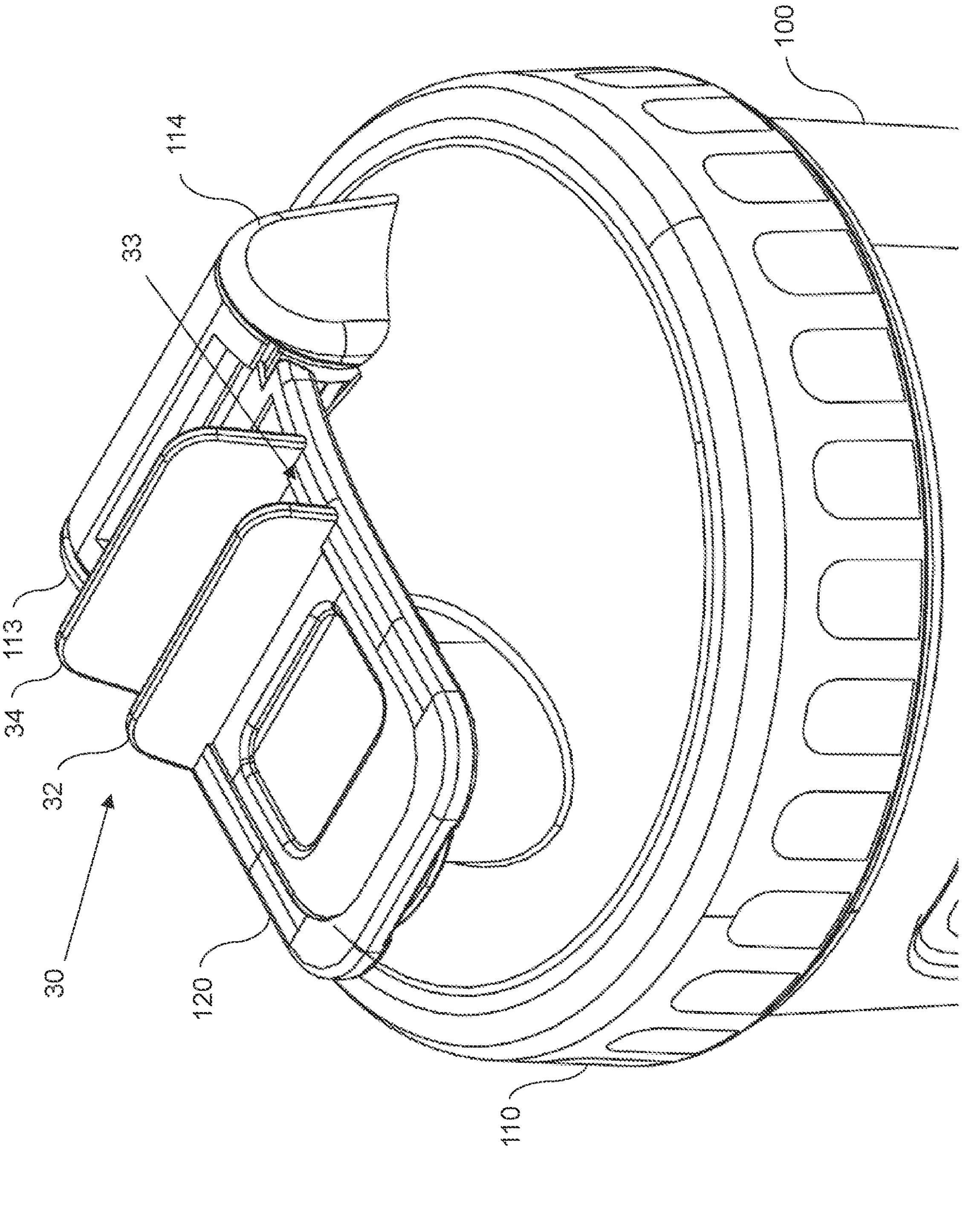
FIG. 16 is a perspective close-up view of the phone holder details of the same and in FIG. 13.

Another component located at the top of the beverage bottle that may be used as a support base for the smartphone 10 is a flip cap 120—see FIGS. 8-18. A permanently integrated phone holder 30 is seen in these figures and comprises a front wall 32 spaced apart from the rear wall 34 by a portion 33 of the flip cap 130, defining the width of the U-shaped channel in a manner that is similar to that described above for the phone holder 20. The front wall 32 and the rear wall 34 may be made to be parallel to each other and extend upward from the flip cap 130 when the flip cap 130 is in a closed position. The rear wall 34 may be longer than the front wall 32. Both the rear wall 34 and the front wall 32 may be positioned at an inclining angle to the vertical plane when the beverage bottle is positioned upright, and the flip cap 120 is in its close position over the bottle mouth 112. The inclining angle may be selected to be from about 1 degree to about 25 degrees so as to position the smartphone to be slightly inclined to provide a better viewing angle to the user. As seen in FIG. 9, the position of the phone holder along the flip cap 120 may be selected to facilitate placement of the phone at or near an overall axis of vertical symmetry of the beverage bottle so as to make the location of the smartphone to be at or near the center of gravity of the entire beverage bottle. In other embodiments, the position of both rear wall 34 and front wall 32 may be shifted along the length of the flip cap 120 anywhere from a position near the axis protrusions 113 and 114 extending from the lid 110, all the way to the front tip of the flip cap 120 located near the bottle mouth 112 of the lid 110, as the invention is not limited in this regard.

Either one or both the rear wall 34 and the front wall 32 may have rounded corners so as to avoid having a beverage bottle with sharp elements protruding therefrom. In use, the position of the flip cap 120 is assumed to be closed. In this case, the flip cap 120 is securely supported on one side by the axis extending between two axis protrusions 113 and 11, and on the other side by the bottle mouth 112. The user is expected to position the smartphone between the rear wall 34 and the front wall 32 of the phone holder 30—as seen in FIGS. 10-14.

In further embodiments, one or several of the elements of the phone holder 30 may be rubberized so as to avoid scratching the phone 10 while using the phone holder 30. Rubberization may be accomplished by providing an elastic layer or an overlay over the rear wall 34, the front wall 32, and/or the supporting bottom surface 33.

In some embodiments, the phone holder 30 may be formed separately and then permanently attached to the flip cap 120, for example, by gluing or thermally fusing them together. In other embodiments, the flip cap 120 may be manufactured together with the phone holder 30, for example, when molded as one piece and from the same plastic material.

In further embodiments, a flip cap 120 with the phone holder 30 may be made as a replacement item for a conventional flip cap of a beverage bottle. Replacement of a conventional flip cap for the flip cap of the present invention containing the phone holder 30 may be advantageous by providing a novel functionality to the user without replacing the entire beverage bottle at the same time.

Figure 18:
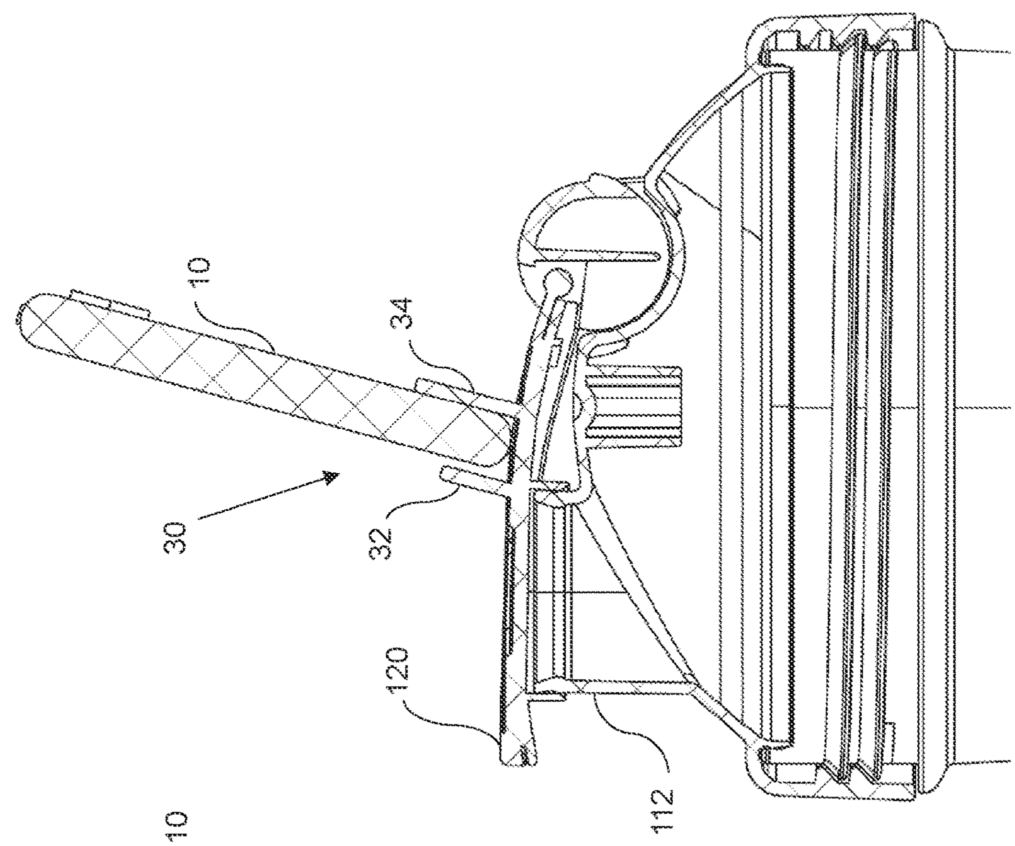
FIG. 18 is a cross-sectional side view of the same as in FIG. 13.
Figure 17:
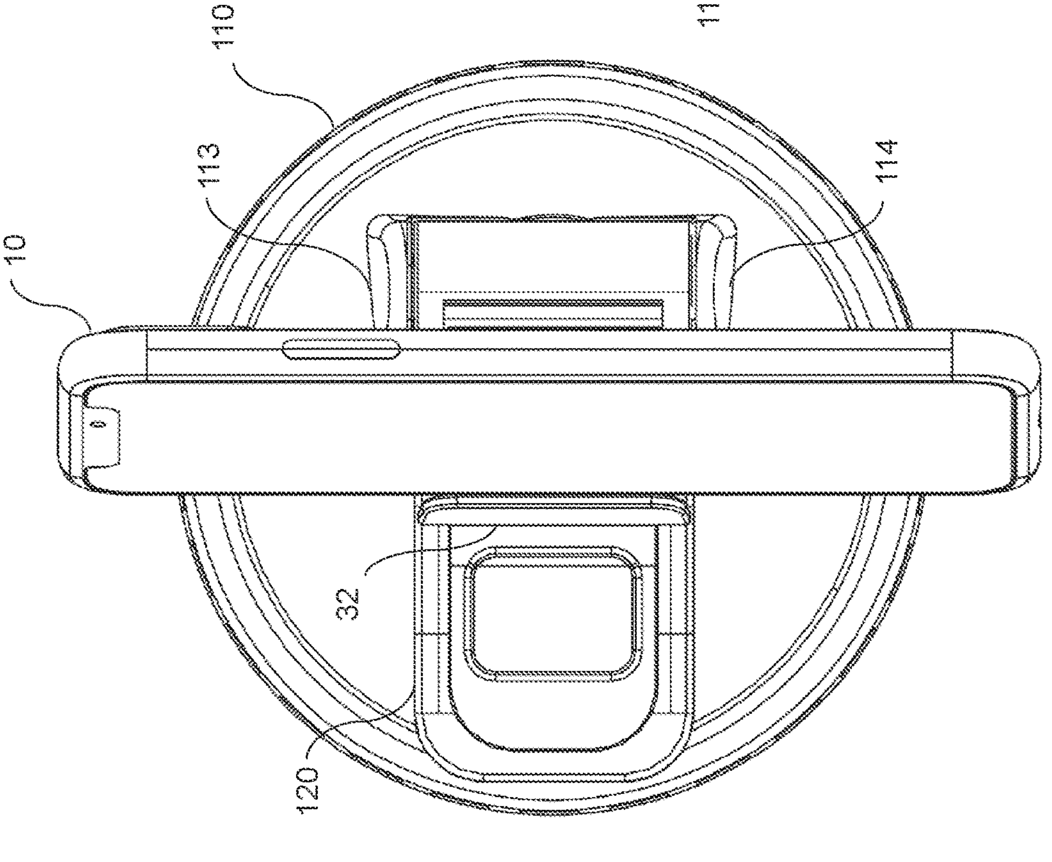
FIG. 17 is a top view of the same as in FIG. 13.
Figure 21:
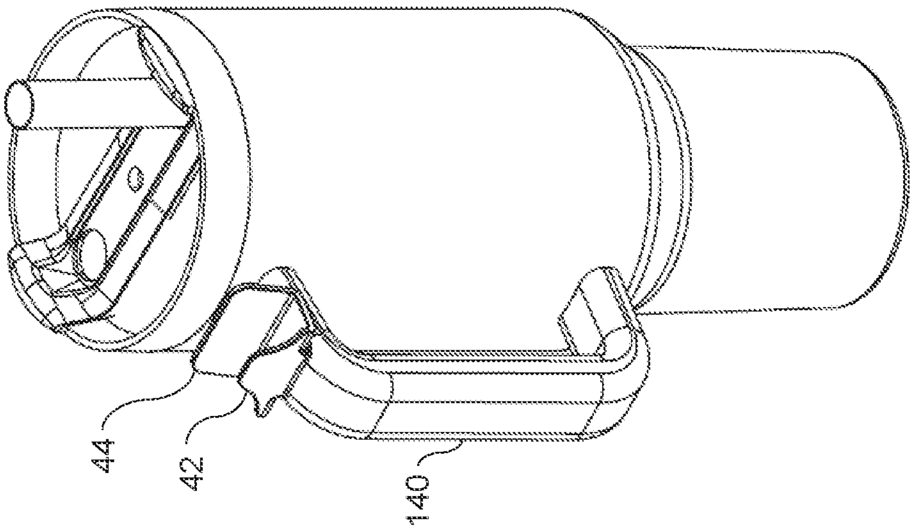
FIG. 21 is a perspective top view of same as in FIG. 19.
Figure 20:
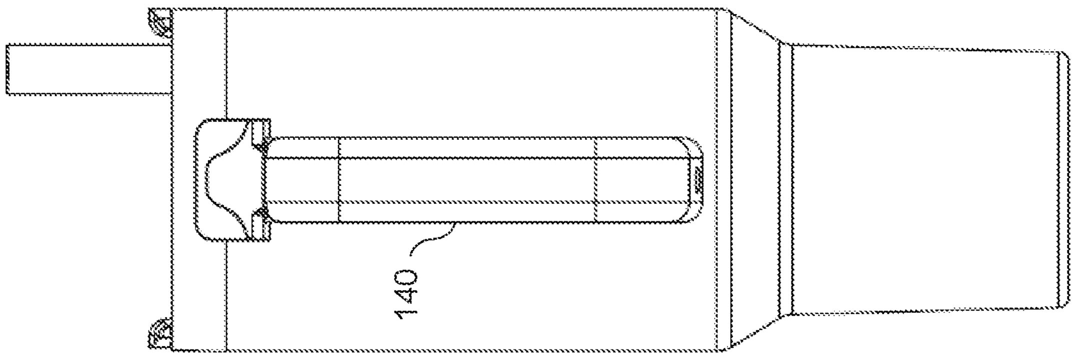
FIG. 20 is a rear view of the same as in FIG. 19.
Figure 19:
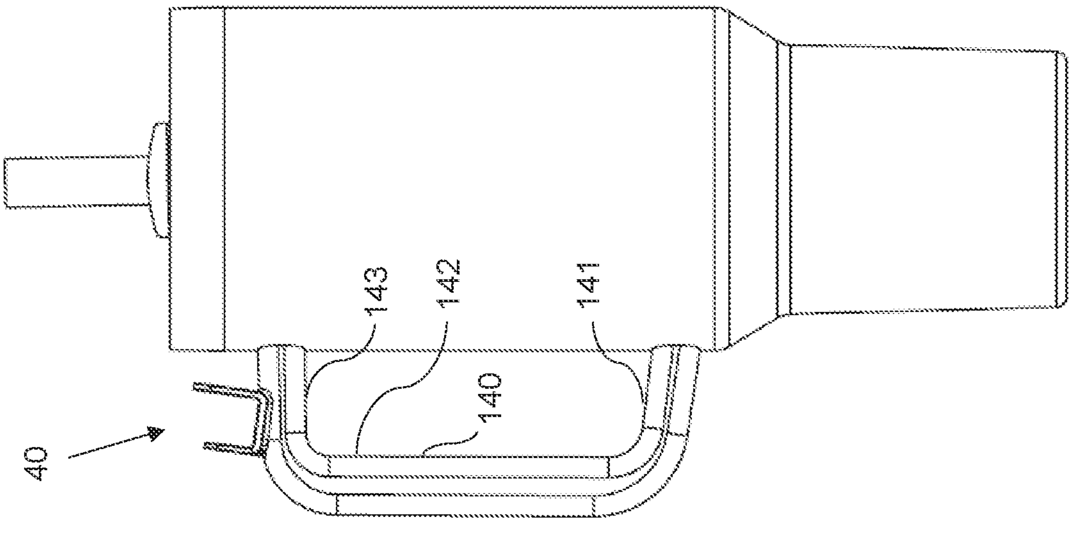
FIG. 19 is a side view of another embodiment of the invention in which the phone holder is incorporated with a handle of the beverage bottle.
Figure 23:
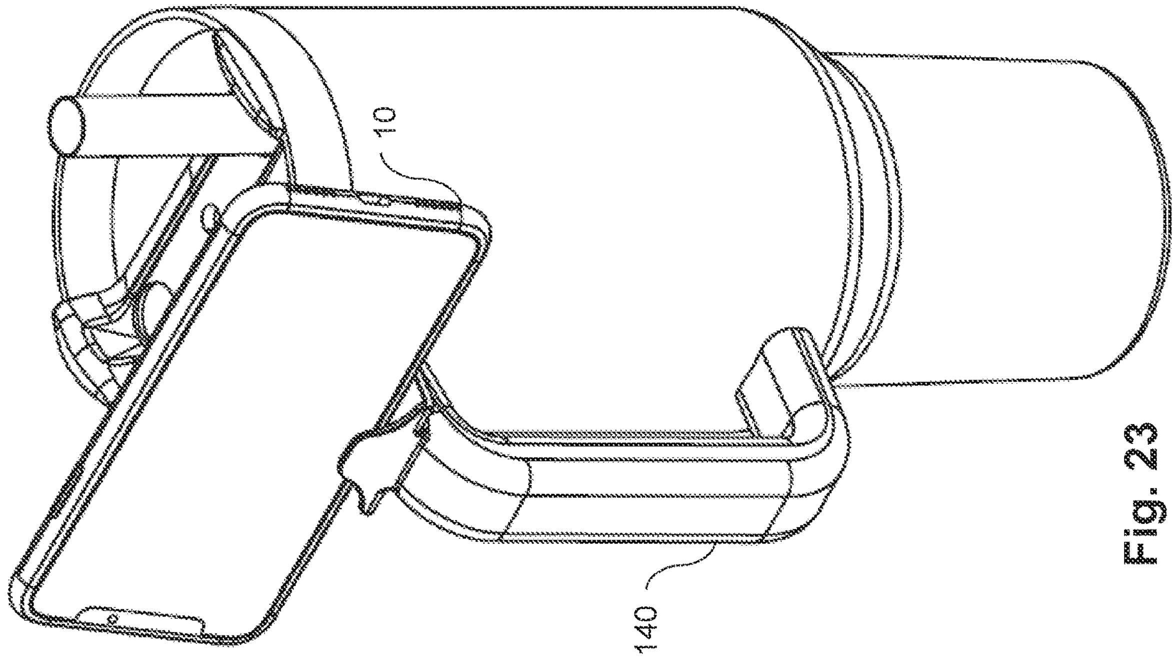
FIG. 23 is a perspective top view of the same as in FIG. 22.
Figure 22:
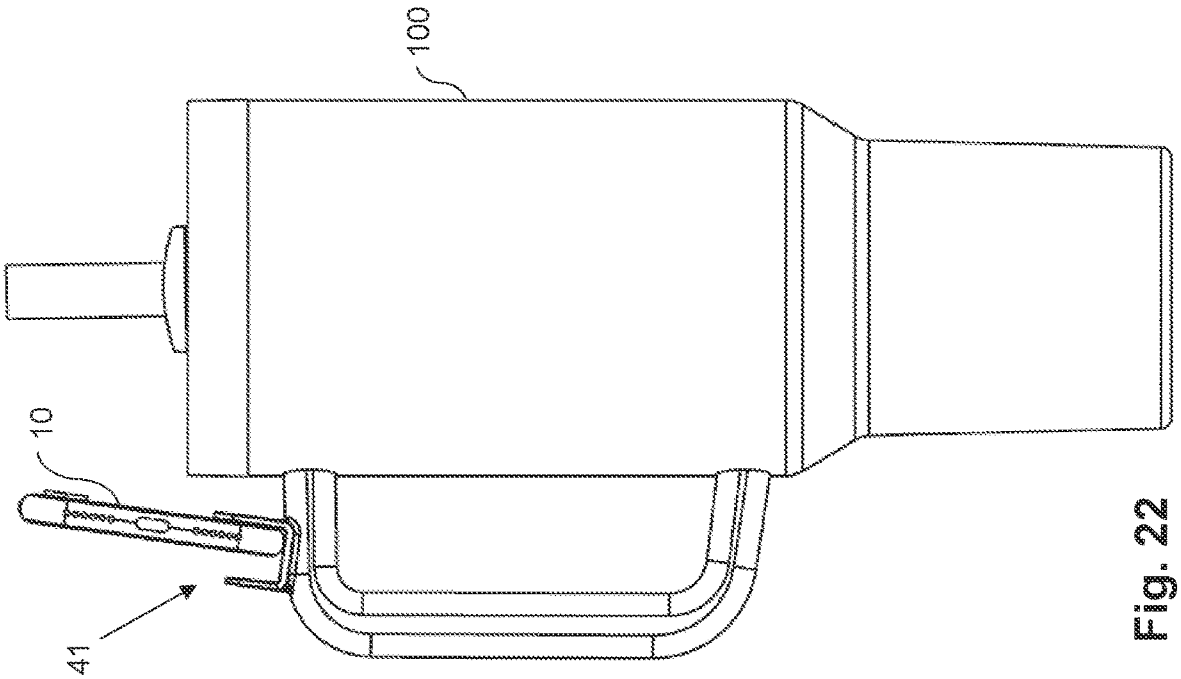
FIG. 22 is a side view of the same as in FIG. 19 with the smartphone supported by the phone holder of the present invention.
Figure 24:
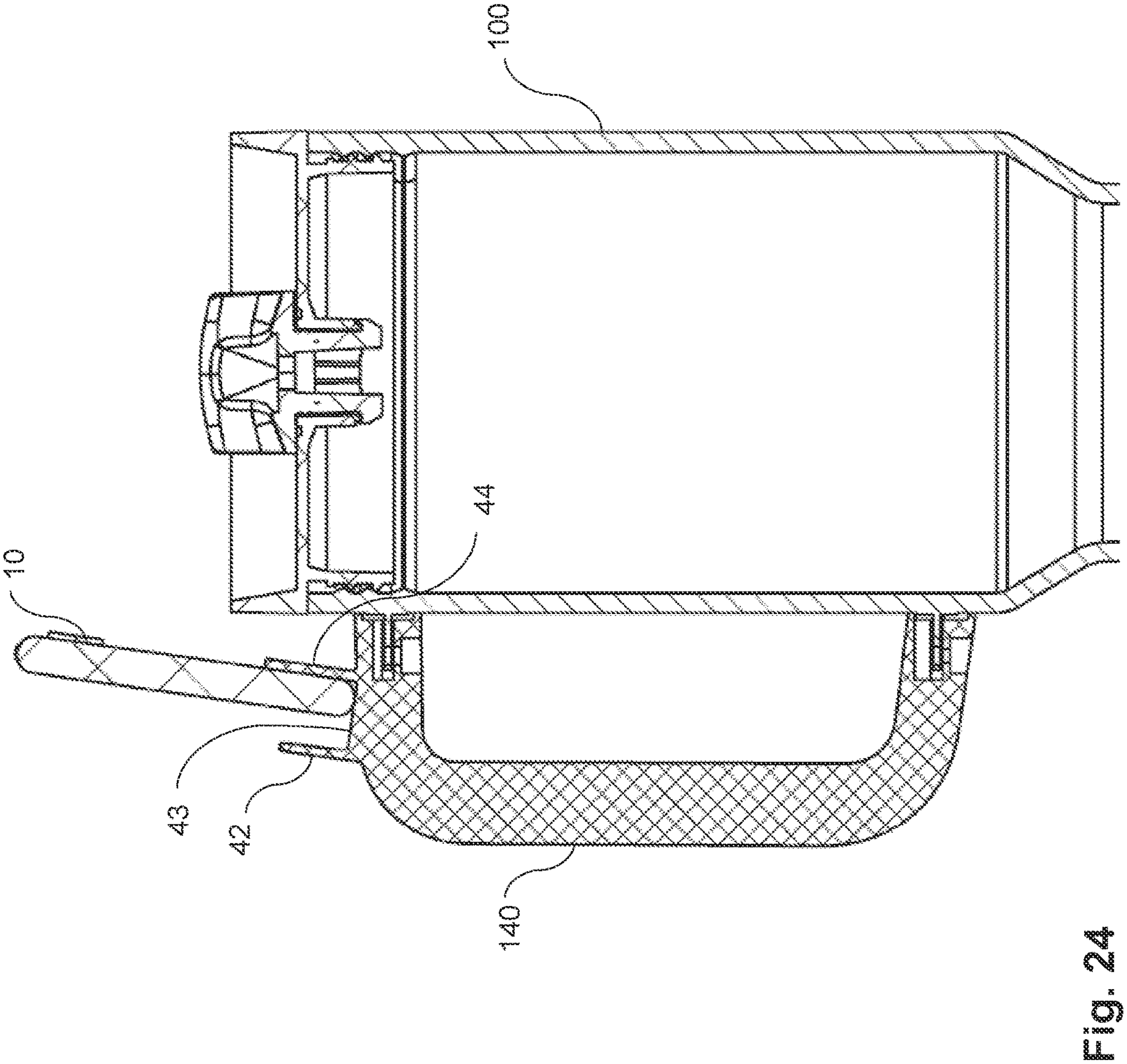
FIG. 24 is a cross-sectional close-up side view of the same as in FIG. 22.

The top view of this embodiment with the smartphone 10 positioned at the phone holder 30 and the cross-sectional view of the same are illustrated in FIGS. 17 and 18 to show that the smartphone 10 may be positioned in a stable manner and at the center of the beverage bottle for easy viewing by the user.

The design of the phone holder 30 described above has a fixed width of the U-shaped channel. As described below for other phone holder embodiments, the phone holder 30 may also be made to have an adjustable width of the U-shaped channel, so as to provide for a stronger retention of various smartphones having slightly different thicknesses between the rear wall and the front wall of the U-shaped channel. Such designs are also contemplated to be within the scope of the present invention.

Smartphone Holder in a Side Handle of the Beverage Bottle

A side handle of the beverage bottle is yet another element that may be used as a supporting base to facilitate hands-free use of the smartphone. One embodiment of the phone holder is illustrated in FIGS. 19-25 and is described now in greater detail.

A typical side handle 140 may generally have a C-shape and define a generally horizontal upper portion 143 attached at one end 145 thereof to the beverage bottle, a generally horizontal lower portion 141 attached at one end 146 thereof to the beverage bottle, and a generally vertical middle portion 142 connecting the upper portion 143 to the lower portion 142.

The upper portion 143 may be attached to the upper tab 115 of the elongated body 100 with an opening 145 equipped, for example, with a retention screw (not sown). The lower portion 141 may be similarly attached to the lower tab 116 extending into the opening 146, which may also contain a retention screw to affix the lower tab 116 therein—see FIG. 19 and FIG. 25.

The phone holder 40 may be incorporated with or form an integral part of the upper portion 143, as seen in FIGS. 19-25, and extend upward therefrom. In some embodiments, the phone holder 40 may be formed separately and then affixed to the handle 140, for example, by gluing, fusing, mechanical coupling, or other methods. In other embodiments, the phone holder 40 may be formed as part of the handle 140—see FIG. 24 for one example of such a design.

As in previous embodiments, the phone holder 40 may have a front wall 42 and a rear wall 44, both with optionally rounded corners so as to avoid having sharp edges protruding from the beverage bottle. The rear wall 44 may be separated from the front wall 42 by a bottom flat supporting surface 43. The spacing between the rear wall 44 and the front wall 42 may be similar to what is described above and configured to accept a variety of smartphones therein. The rear wall 44 may be longer than the front wall 42 to provide better support for the smartphone while in the phone holder 40. As in other embodiments, both the rear wall 44 and the front wall 42 may be parallel to each other and be oriented at a slight inclining angle to a vertical plane, to facilitate observing the smartphone at an inclined angle—see FIG. 24 and FIG. 25.

As with the phone holder 30, the phone holder 40 may be positioned along the upper portion 143 at any convenient location selected to retain the smartphone 10 on the beverage bottle of the invention. Parts of the phone holder 40 may be rubberized to increase the friction and retention of the smartphone while placed in the U-shaped channel 41 of the phone holder 40.

Figure 25:
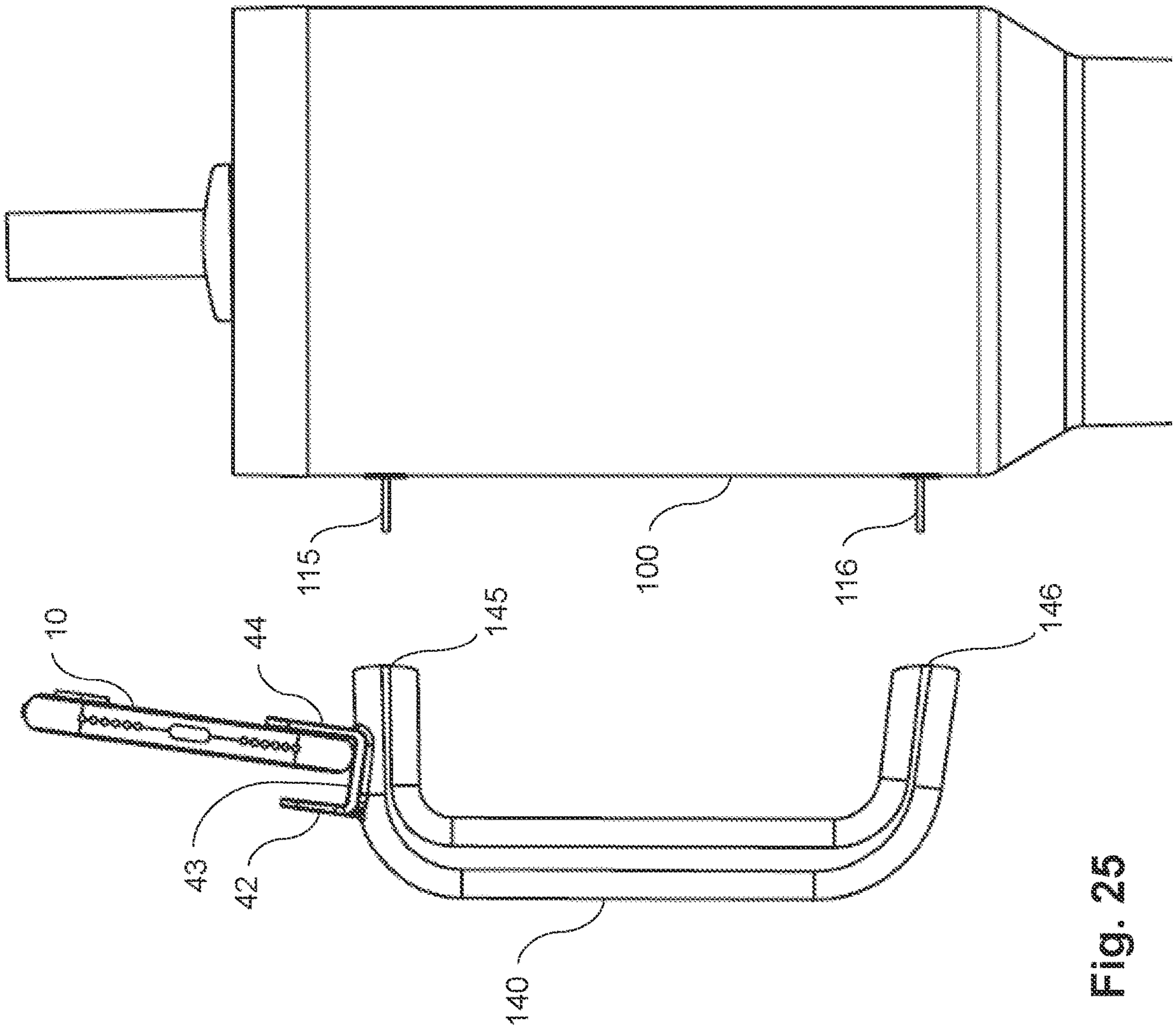
FIG. 25 is a side view of the same as in FIG. 22, showing a detachable handle.
Figure 26:
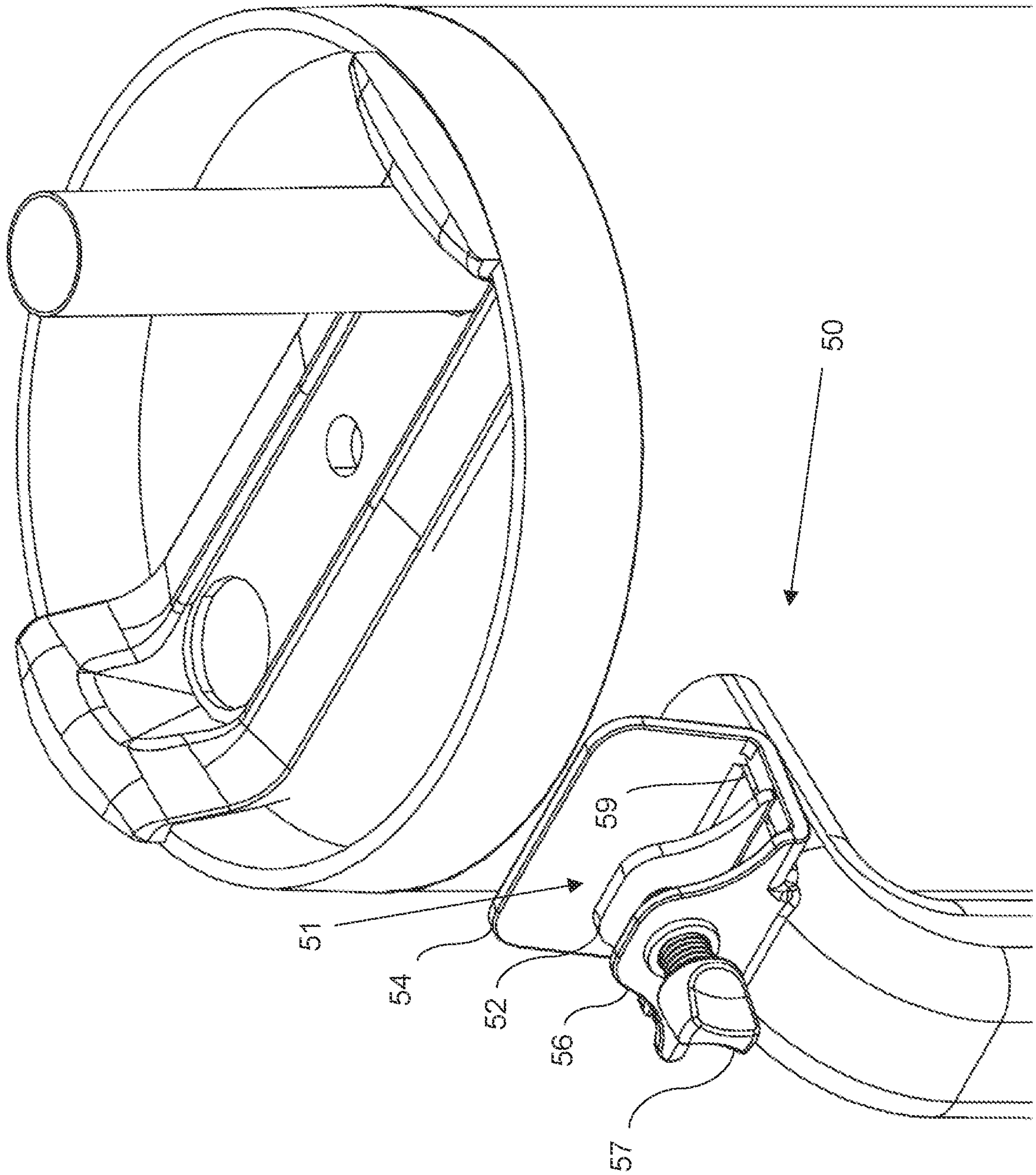
FIG. 26 is a perspective close-up view of another embodiment of the phone holder incorporated with a handle of the beverage bottle.
Figure 27:
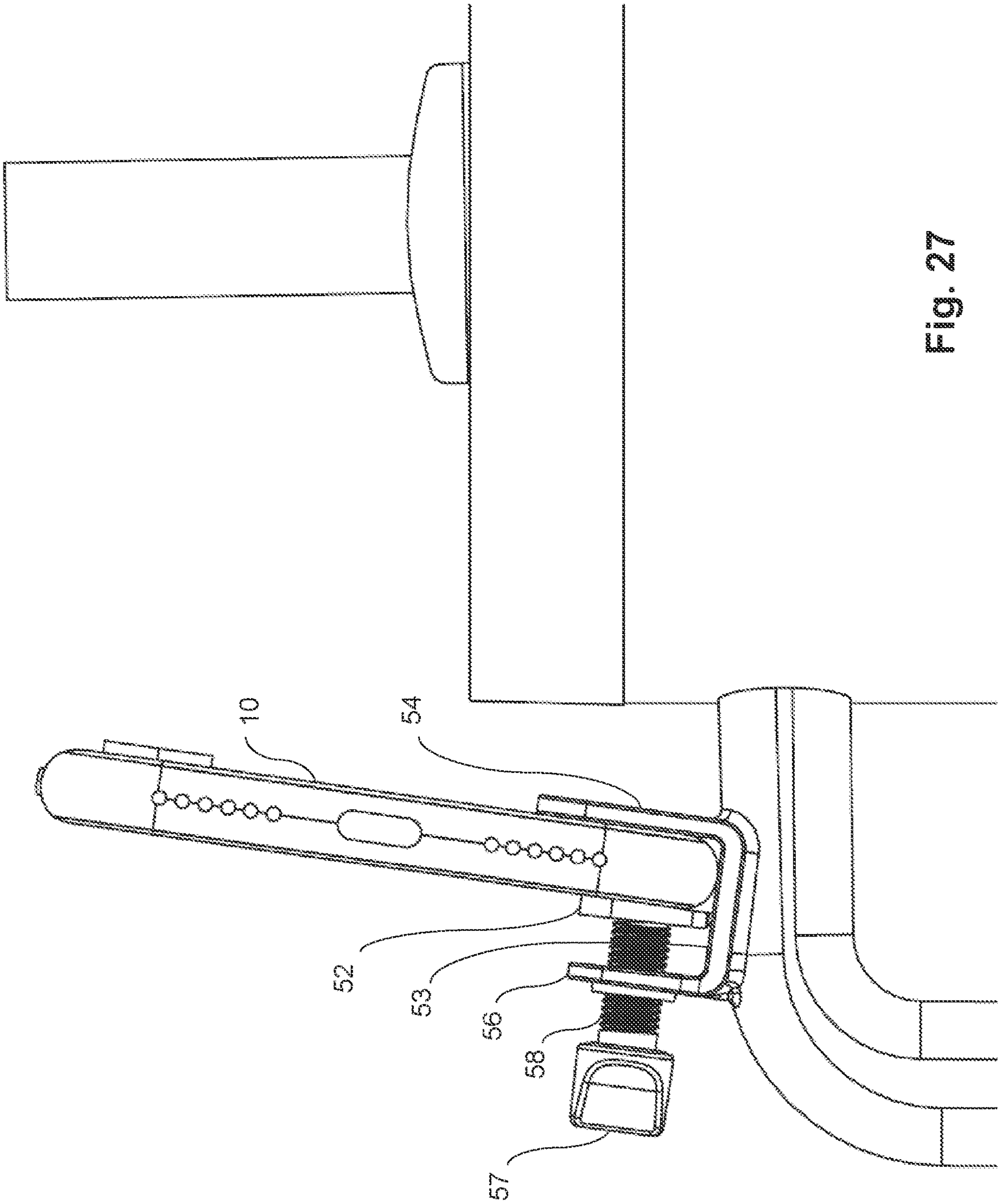
FIG. 27 is a side view of the same as in FIG. 26.
Figure 28:
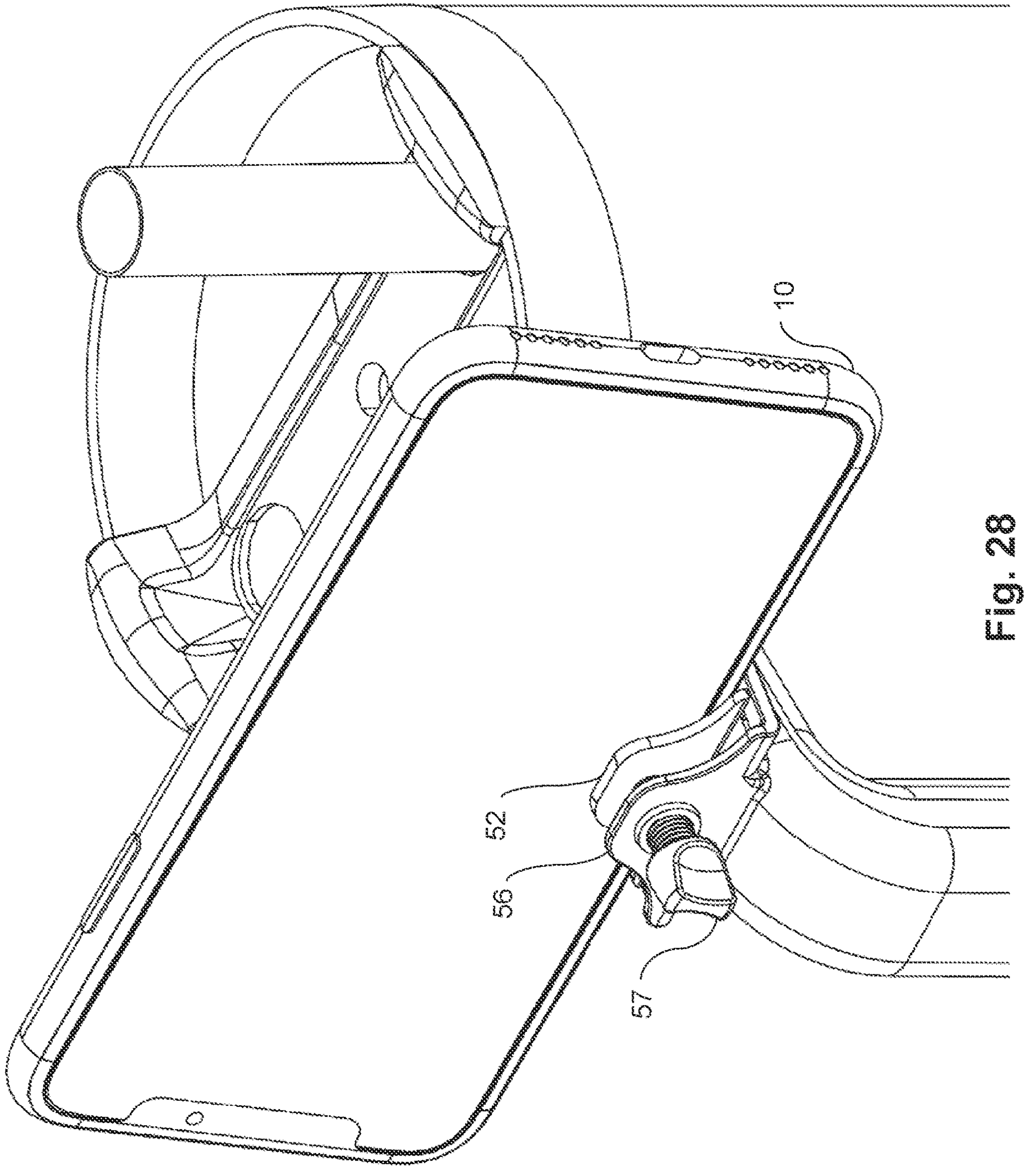
FIG. 28 is a perspective top close-up view of the same as in FIG. 22 with the smartphone retained in the phone holder.
Figure 29:
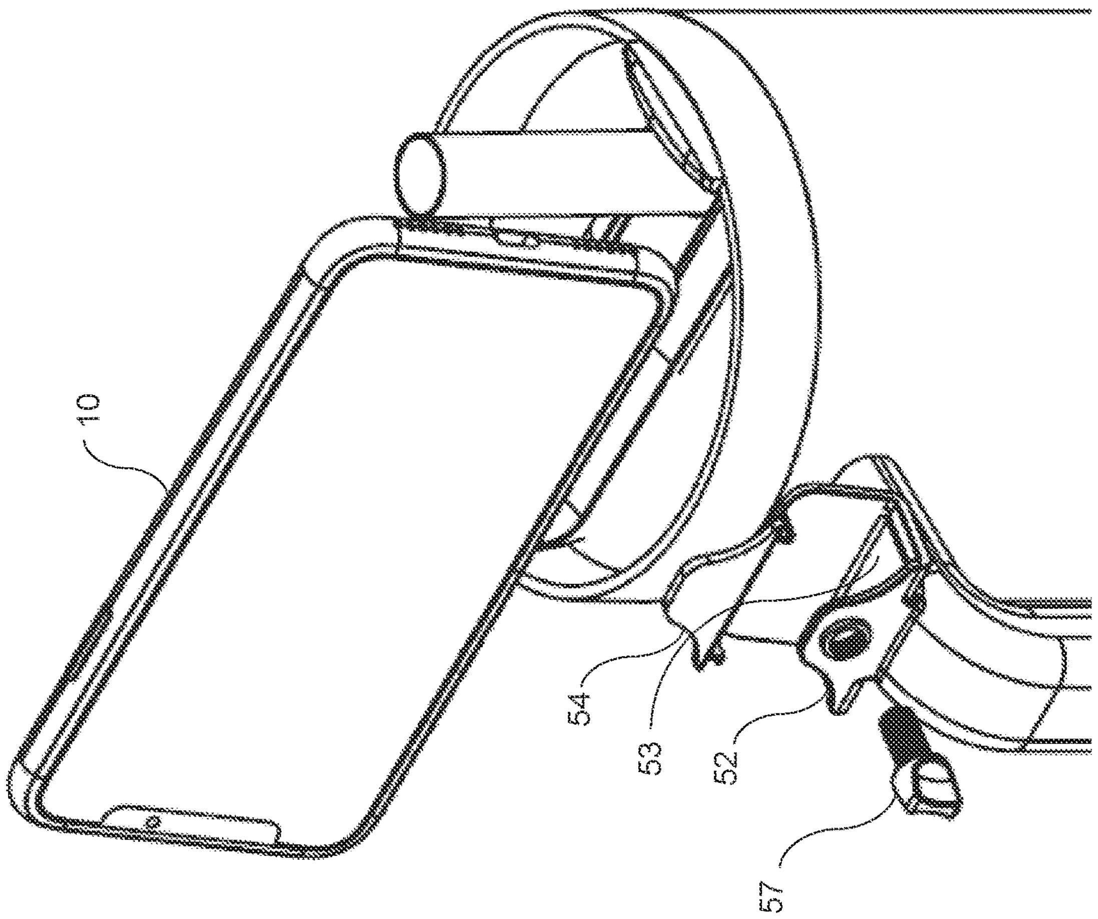
FIG. 29 is a perspective exploded view of the same as in FIG. 28, showing individual components of the phone holder.
Figure 30:
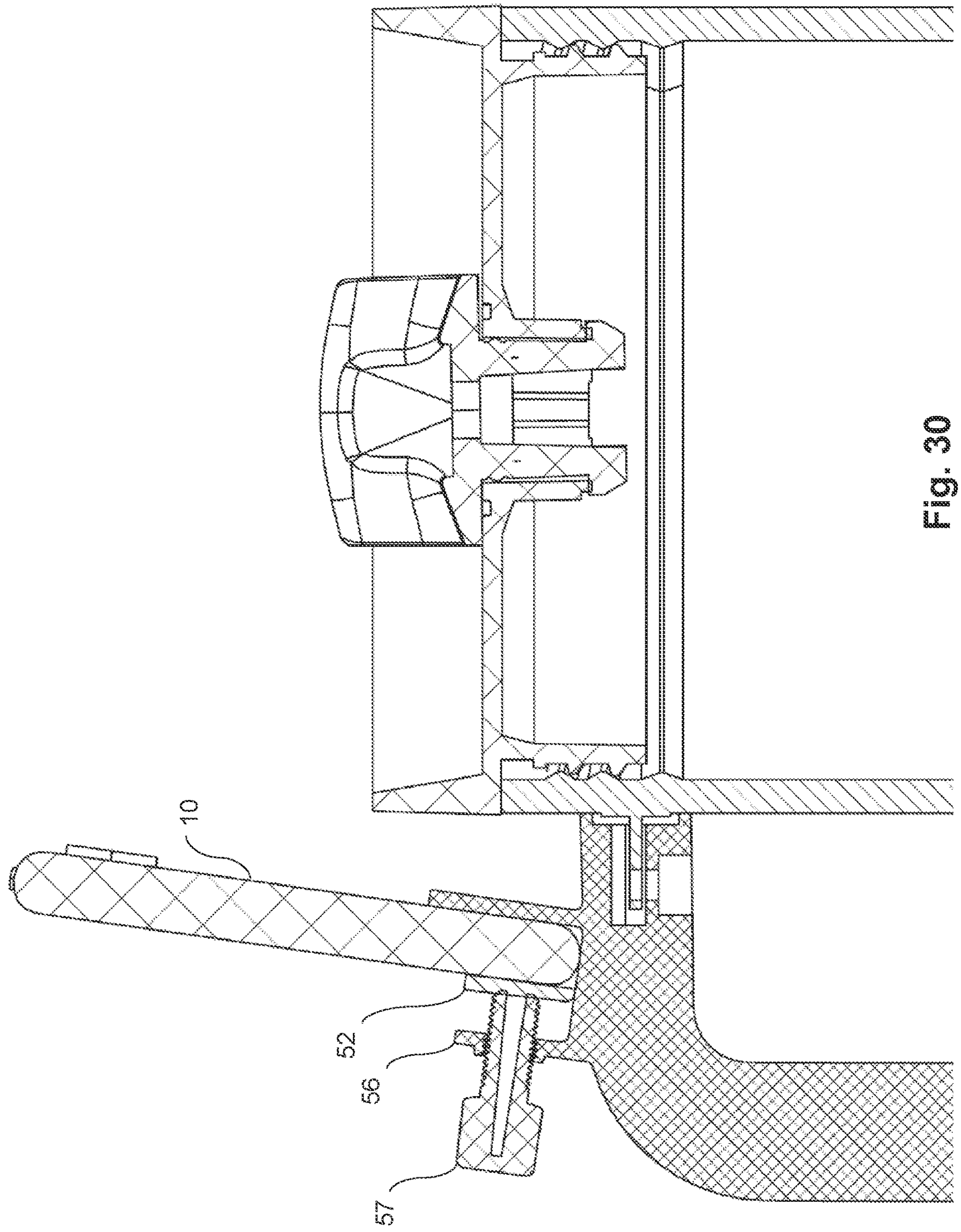
FIG. 30 is a cross-sectional view of the same as in FIG. 28.
Figure 33:
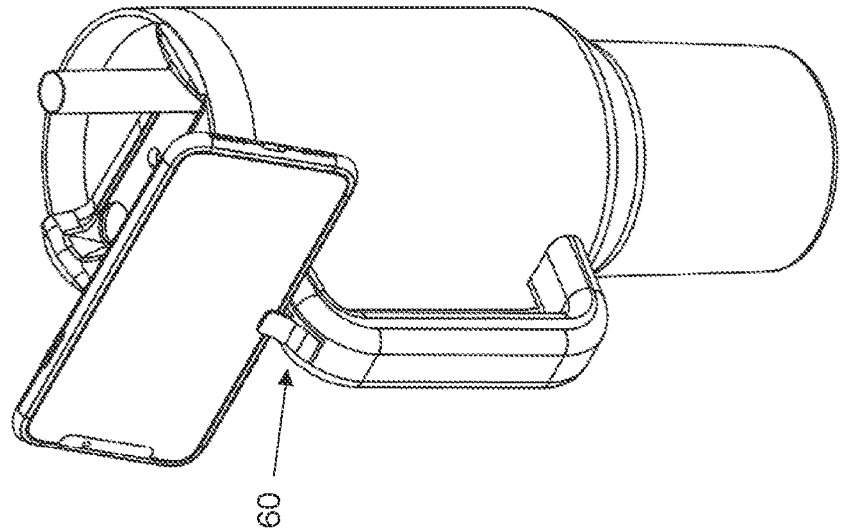
FIG. 33 is a perspective front view of the same as in FIG. 31.
Figure 32:
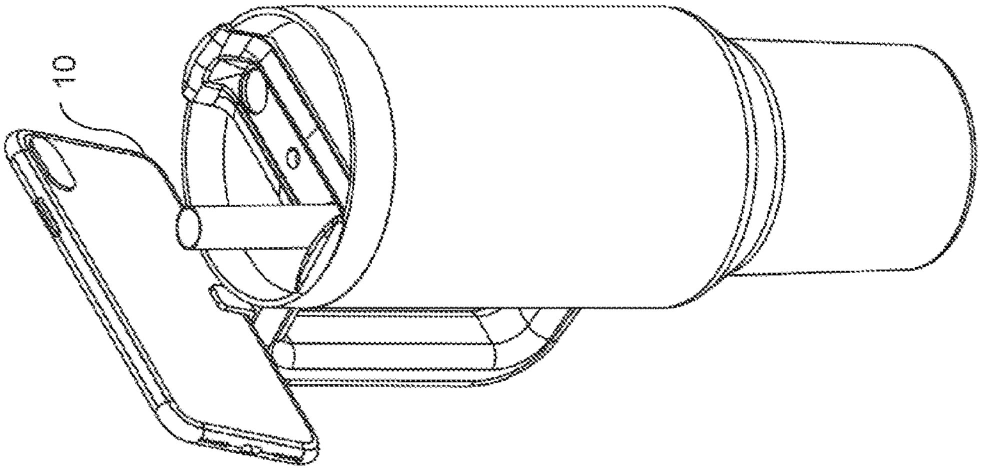
FIG. 32 is a perspective rear view of the same as in FIG. 31.
Figure 31:
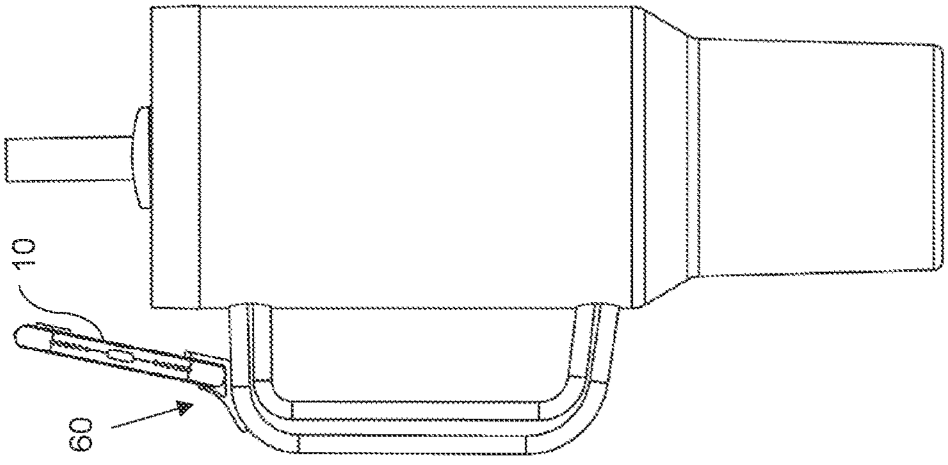
FIG. 31 is a side view of another yet embodiment of the invention with the phone holder inserted into the handle of the beverage bottle.
Figure 34:
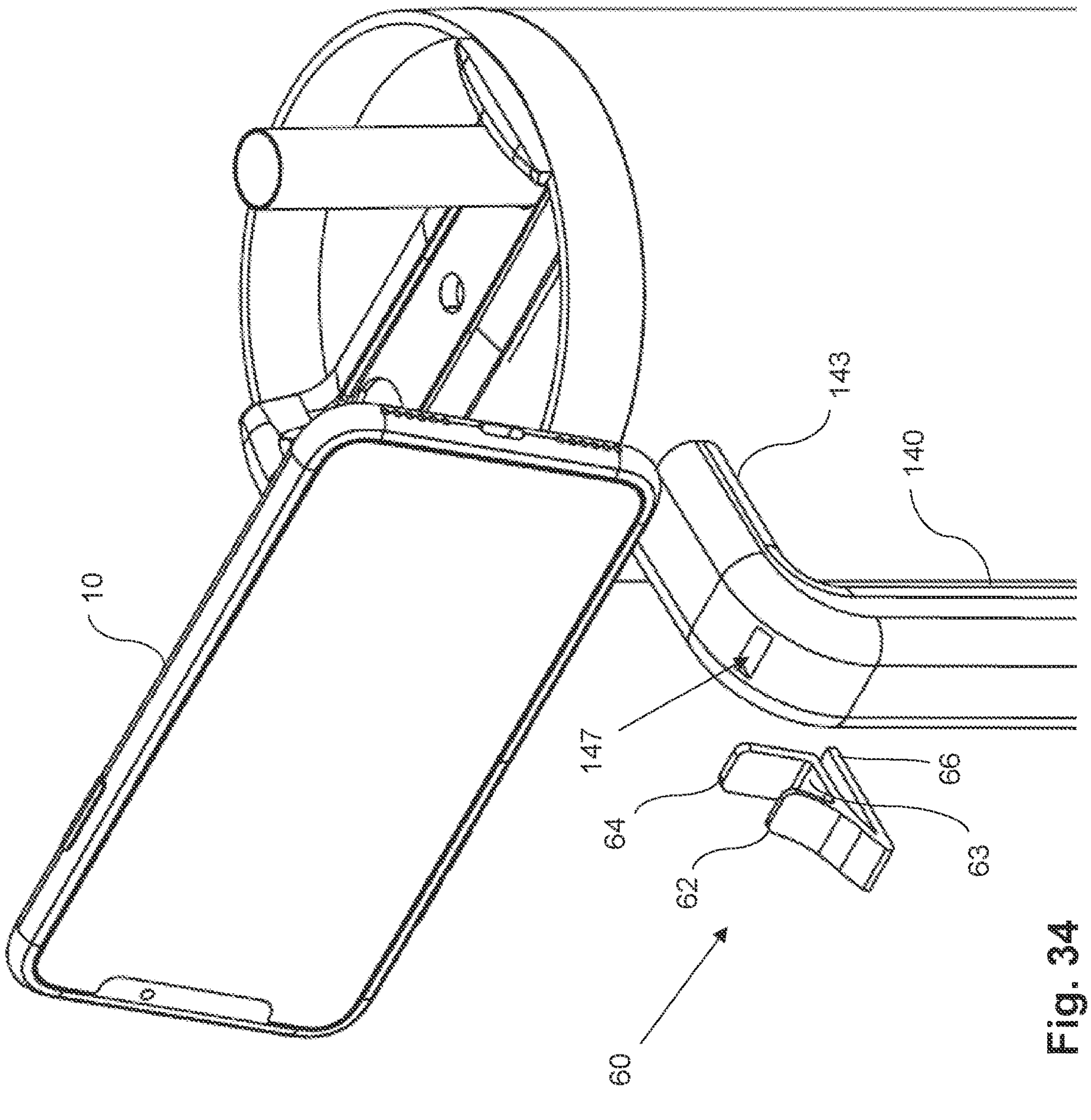
FIG. 34 is a perspective exploded close-up view of the same as in FIG. 31.
Figure 35:
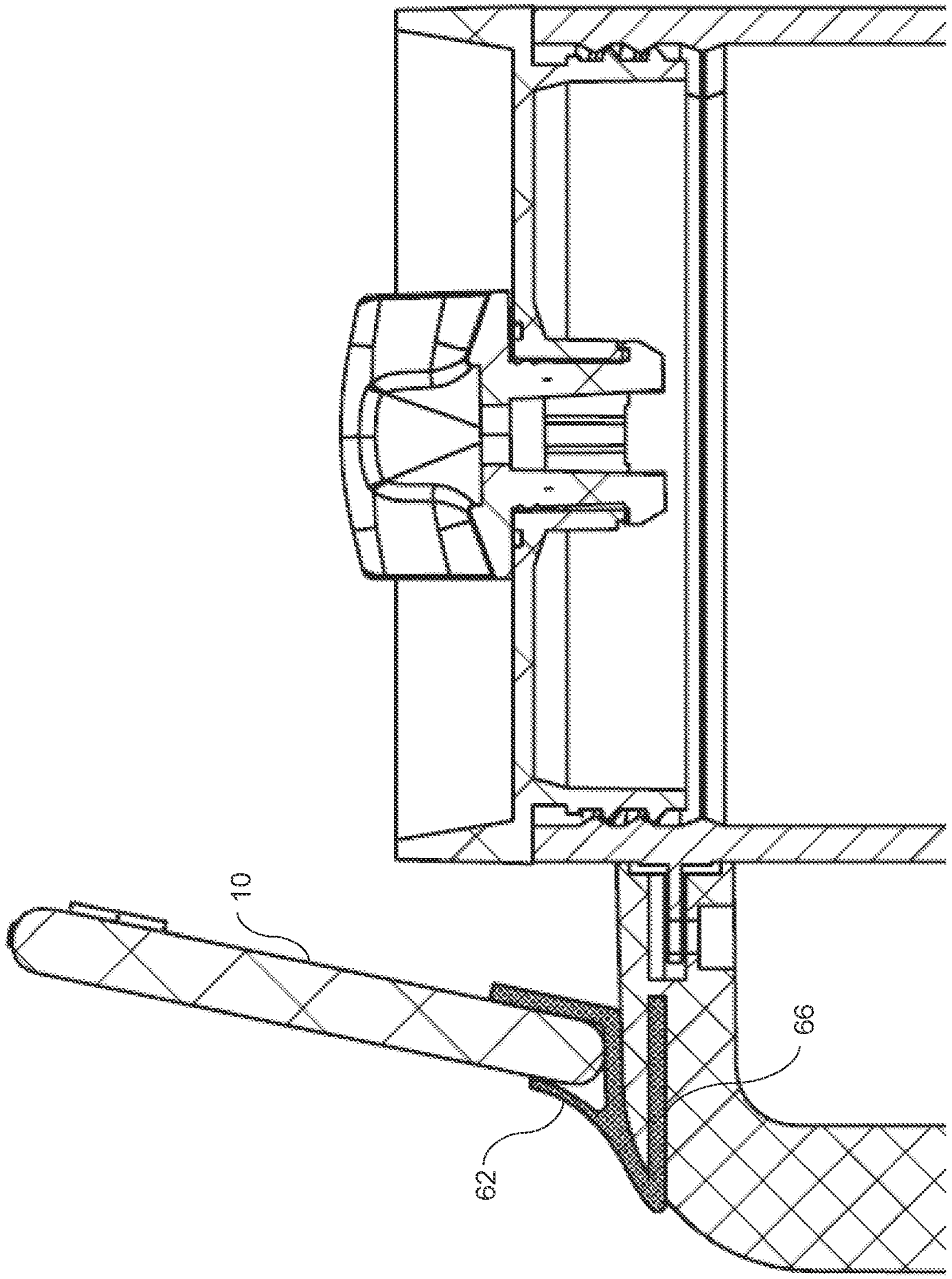
FIG. 35 is a cross-sectional close-up view of the same as in FIG. 31.

As the side handle is typically retained at the beverage bottle by two retention screws, there is an opportunity to replace a conventional side handle with the side handle of the present invention. The C-shaped handle 140 may be manufactured to be a replacement handle for the beverage bottle so as to provide an opportunity to enjoy a phone holder feature without the need to replace the entire beverage bottle, as seen in FIG. 25.

An adjustable embodiment of the phone holder 50 is illustrated in FIGS. 26-30. As mentioned above, different smartphones and tablets vary in thickness. Additionally, the presence of a jacket covering the smartphone may further increase its thickness. While all phone holders described above have a simple design with a fixed width of their corresponding U-shaped channel, the invention is not limited to this fixed design.

Adjustable phone holder 50 may generally include a front wall 52 slidingly movable across the bottom support surface 53 toward or away from the rear wall 54 as defined by an adjustment screw 57 threadedly attached to a base wall 56 extending from the bottom support surface 53 outside the U-shaped channel. In embodiments, the phone holder 50 may include the fixedly positioned rear wall 54 and the fixedly positioned base wall 56 separated from the rear wall 54 by the bottom supporting surface 53. The slidingly movable front wall 52 may be engaged with the bottom supporting surface 53 via a pair of protrusions extending down from the front wall 52, which are sliding in the corresponding pair of grooves 59 extending from the base wall 56 to the rear wall 54. The adjustment screw 57 is provided and features a threaded portion 58 (see FIG. 26 and FIG. 27) threadedly engaged with a corresponding opening in the base wall 56. The end of the threaded portion 58 is rotatably attached to the movable front wall 52, such that the rotation of the screw 57 causes the front wall to move closer to or further away from the rear wall 54.

In use, the front wall 52 may be first moved back to the base wall 56 by rotating the screw 57 in the corresponding direction, so as to widen the U-shaped channel 51 available for positioning the smartphone 10 into the phone holder 50. The screw may then be rotated in the opposite direction to move the front wall 52 toward the rear wall 54 and clamp the smartphone 10 in between. Release of the smartphone 10 is done by turning the screw 57 to cause the front wall 52 to move back again to loosen the smartphone 10 and allow for its removal from the phone holder 50.

As before, the rear wall 54 and the front wall 52 may be made to be parallel to each other and extend from the side handle 140 generally vertically and with a small inclining angle. As can be appreciated by those skilled in the art, other width adjustment mechanisms may also be suitable for implementation of the phone holder 50, as the invention is not limited to the adjustment screw concept. Examples of such alternative mechanisms include various clamping, wedging, and other adjustable retention concepts.

A further yet embodiment of the phone holder 60 is illustrated in FIGS. 31-35 and is now described in greater detail. It may have a rear wall 64 and a front wall 62. In some embodiments, the front wall 62 may be made flexible so as to retain various smartphones therein despite some differences in their thicknesses. In this case, the smartphone may be placed within the phone holder 60 by first deflecting the front wall 62 away from the rear wall 64 and then inserting the smartphone 10 to be clamped by the front wall 62, which returns to its original position and applies a low level of pressure on the smartphone 10 positioned between the rear wall 64 and the front wall 62.

The phone holder 60 further features a bar 66 made to be an integral part of the phone holder 60 (see FIG. 35) but positioned to be spaced apart and parallel with the bottom support surface 63. Spacing between these two components may range from about ⅛ of an inch to about ½ of an inch. This spacing is needed to mount the phone holder 60 on the side handle 140. This may be accomplished by providing a slot 147 in the upper portion 143 of the handle 140 sized to removably accept the bar 66 inside thereof.

In use, the phone holder 60 may be attached to the side handle 140 by inserting bar 66 into the corresponding opening 147, which extends along the upper portion 143 of the handle 140. The smartphone 10 is then placed to rest of the supporting bottom surface 63 and the phone may be used hands-free until it is removed from the phone holder 60.

A further yet embodiment of the phone holder 70 built into the side handle 140 is illustrated in FIGS. 36-47 and is now described in greater detail. The phone holder 70 may include a spring-loaded pivot arm 72 rotatably attached to the upper handle portion 143 in a normally closed position. Pulling the pivot arm 72 away from the upper handle portion 143 and against a spring 75, incorporated within the upper handle portion 143, opens up a channel sized to accept the smartphone therein. In embodiments, the mechanism of the phone holder 70 includes a torsion spring 75 with one end attached to the upper handle portion 143 inside cavity 78 formed therein. The other end of the spring 75 is attached to the pivot arm 72 using pin 77. The spring 75 keeps the pivot arm 72 rotated about the axis 76 toward the upper portion 143 so as to form a smooth external profile of the upper portion 143, similar to the profile of a regular side handle without the phone holder 70 built therein. The free end of the pivot arm 72 may be covered with a rubber coating 73. The bottom of the upper handle portion forms a supporting surface for the pivot arm 72 may also have a rubber coating 71. Men the pivot arm is in its close position, the rubber coating of the free end 73 may abut the rear wall 74, which in turn forms a supporting wall for placement of the smartphone 10 against thereof—see FIG. 36.

Figure 38:
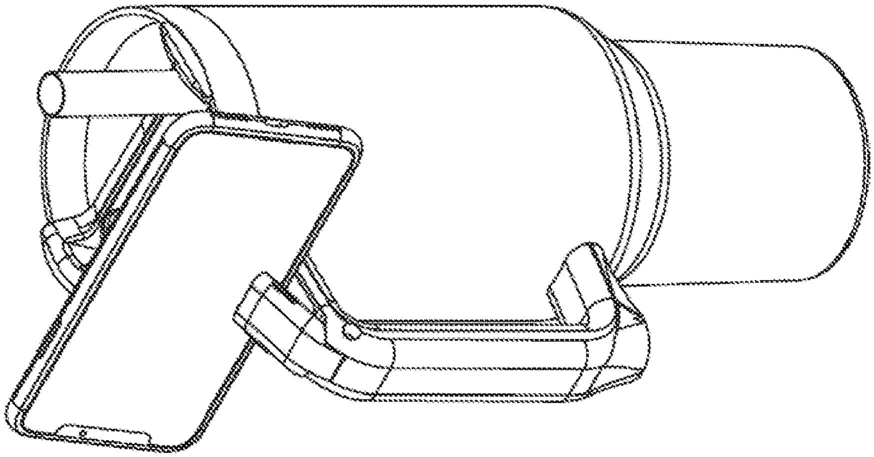
FIG. 38 is a perspective view of the same as in FIG. 36.
Figure 37:
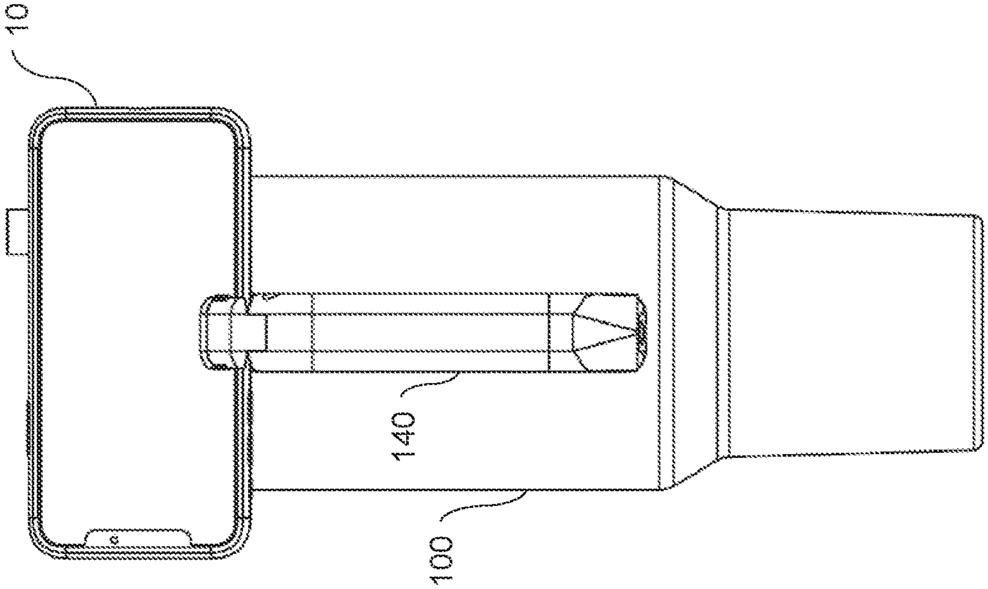
FIG. 37 is a rear view of the same as in FIG. 36.
Figure 36:
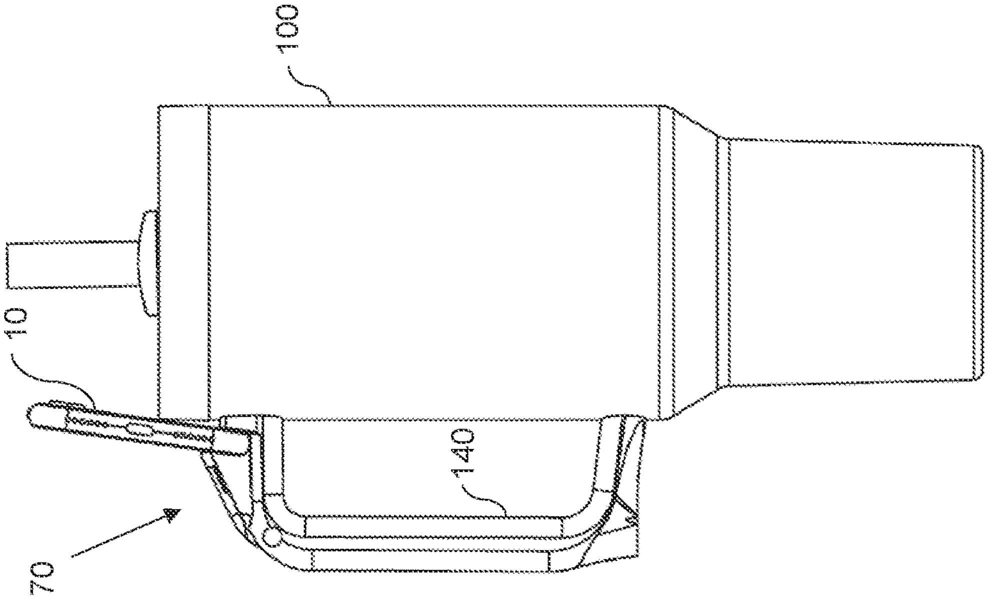
FIG. 36 is a side view of yet another embodiment of the present invention with spring-loaded phone holder incorporated with the side handle of the beverage bottle.
Figure 40:
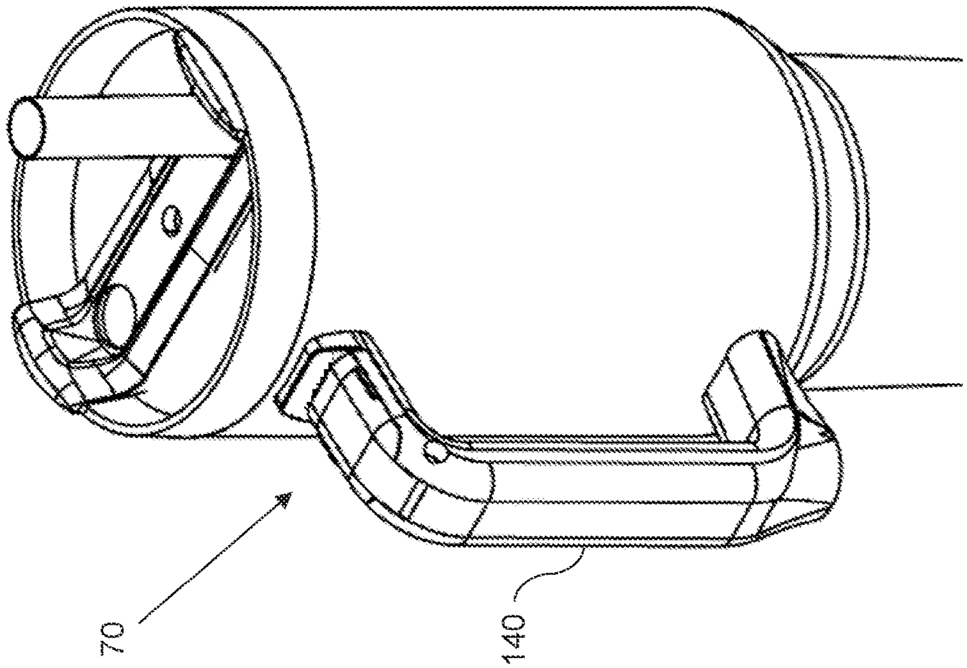
FIG. 40 is a perspective top close-up view of the same as in FIG. 39.
Figure 39:
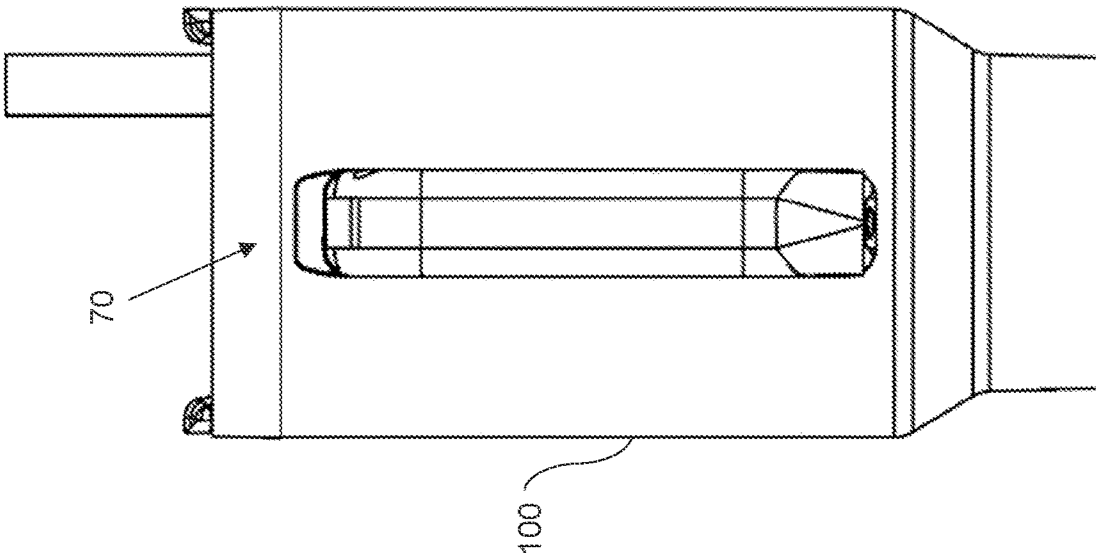
FIG. 39 is a rear close-up view of the same embodiment as in FIG. 36 but without the smartphone.
Figure 43:
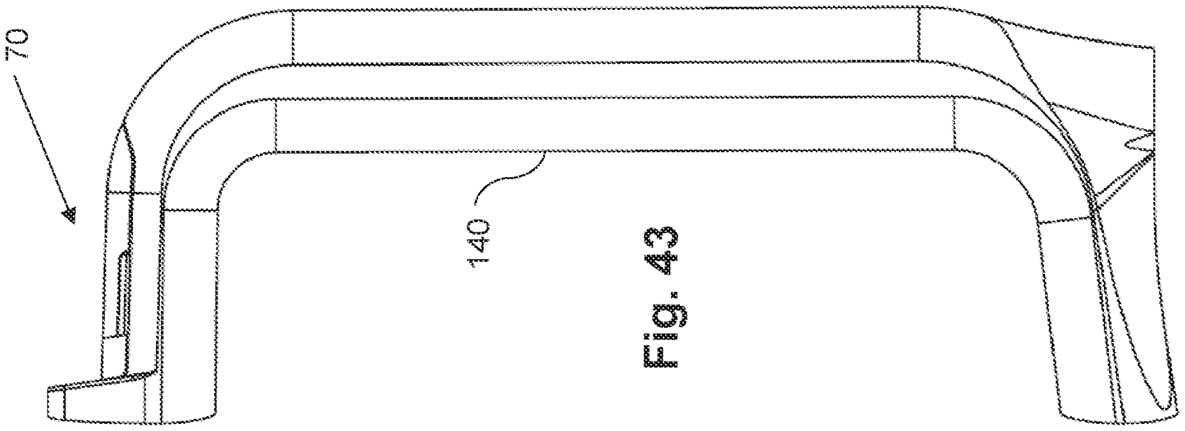
FIG. 43 is a second side view of the handle of the same as in FIG. 36.
Figure 42:
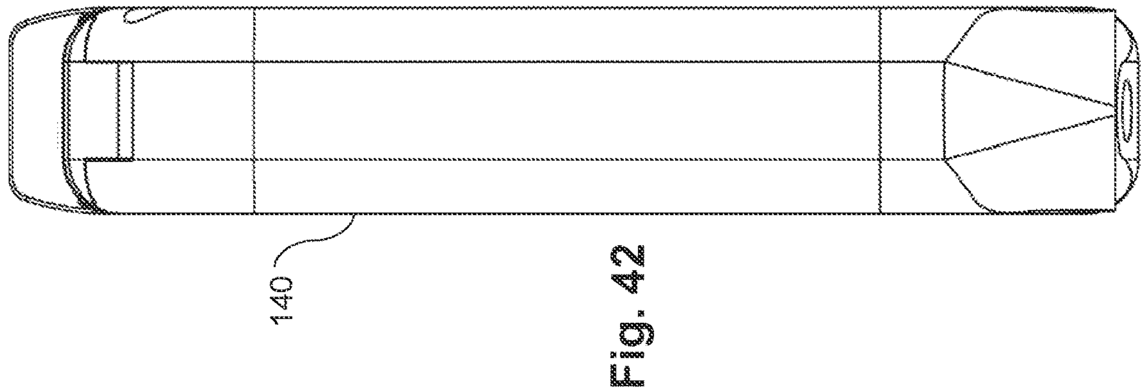
FIG. 42 is a rear view of the handle of the same as in FIG. 36.
Figure 41:
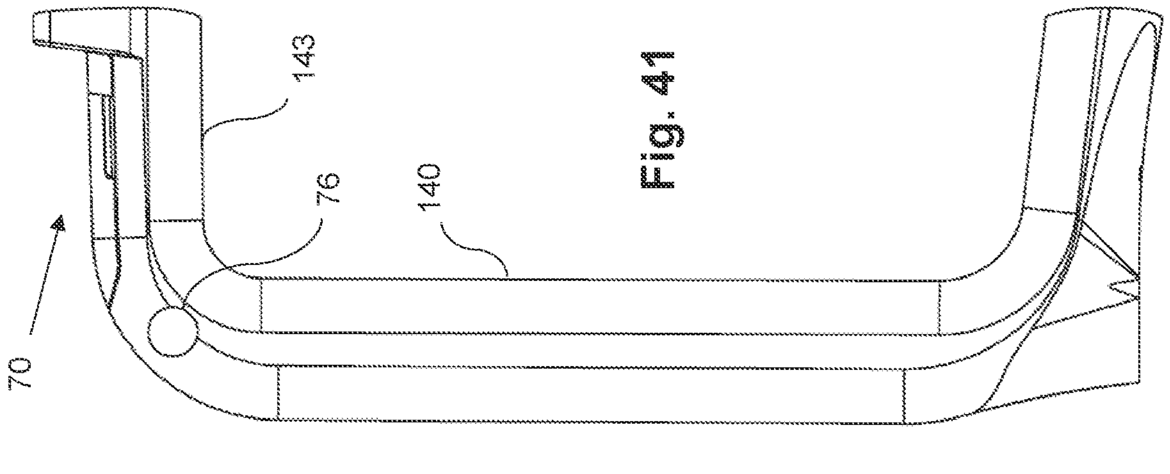
FIG. 41 is a first side view of the handle of the same as in FIG. 36.
Figure 47:
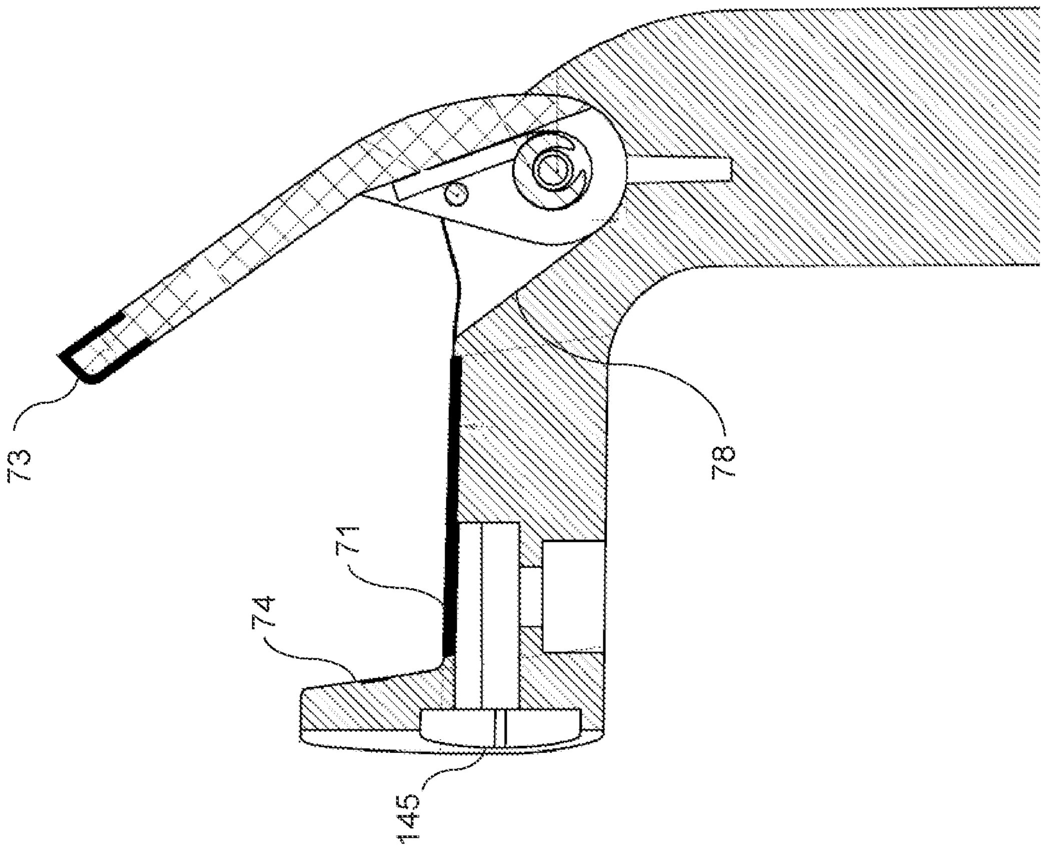
FIG. 47 is a cross-sectional close-up view of the handle as in FIGS. 41-45 with the phone holder in an open position.
Figure 46:
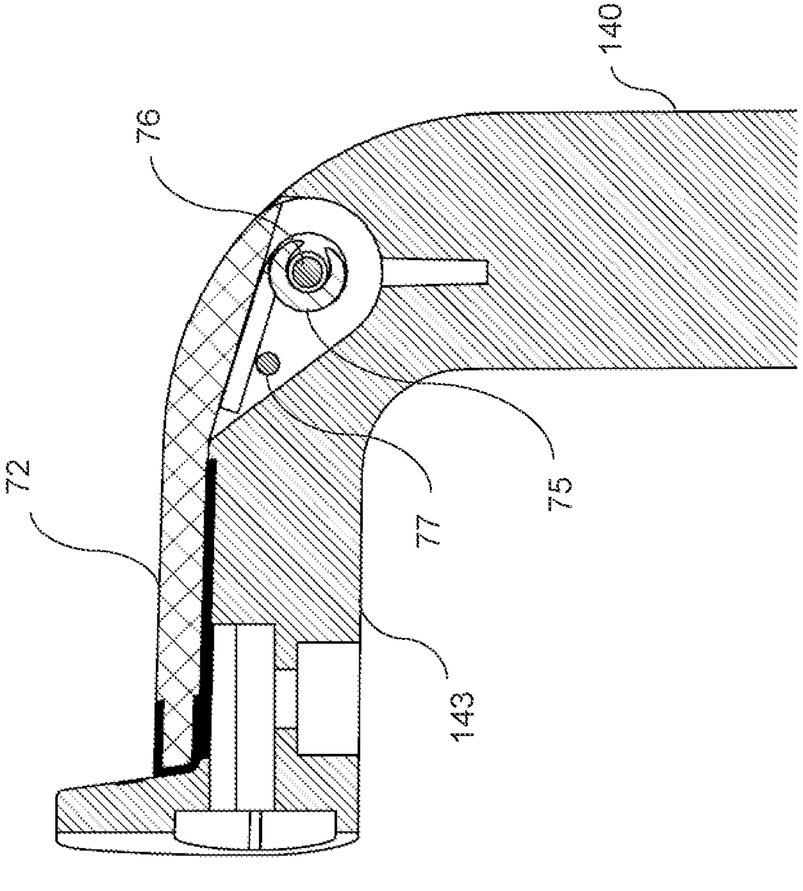
FIG. 46 is a cross-sectional close-up view of the handle as in FIGS. 41-45 with the phone holder in a closed position.
Figure 49:
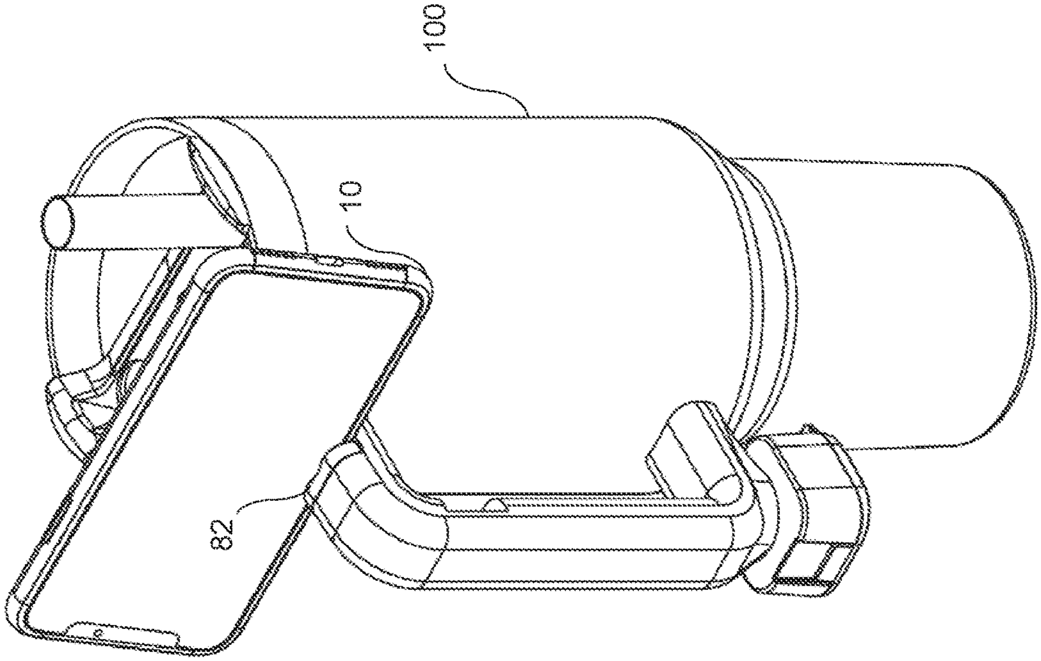
FIG. 49 is a perspective top view of the same as in FIG. 48.
Figure 48:
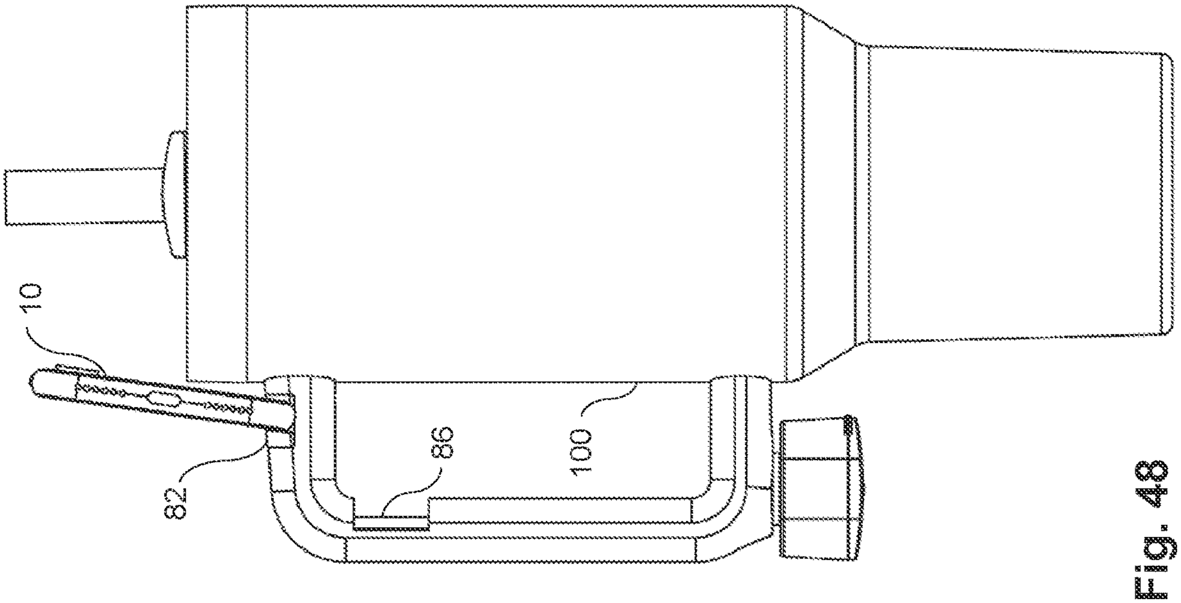
FIG. 48 is a side view of yet another embodiment of the invention with the phone holder incorporated into a handle of the beverage bottle.

The pivot handle 72 may be lifted from its normally closed position by holding it using one or two undercuts 79 and pulling it upward away from the handle 140—see FIG. 47. Pulling the pivot handle 72 by hand (such as using one or two undercuts 79) moves it to the open position and allows placement of the smartphone 10 between the free rubberized end 73 and the rear wall 74. Releasing the pivot handle causes the spring 75 to urge the free rubberized end 73 to rest against the smartphone 10, which in turn is pushed to rest on the rear wall 74. This configuration is illustrated in FIGS. 36-38.

One advantage of this design is that without a smartphone 10 present, the side handle 140 has an outline of a conventional side handle with no parts of the phone holder protruding therefrom. Another advantage is that smartphones of various thicknesses can be retained by the phone holder 70 due to the varying degree of the pivot arm 72 pulled away from the upper handle portion 143.

Figure 45:
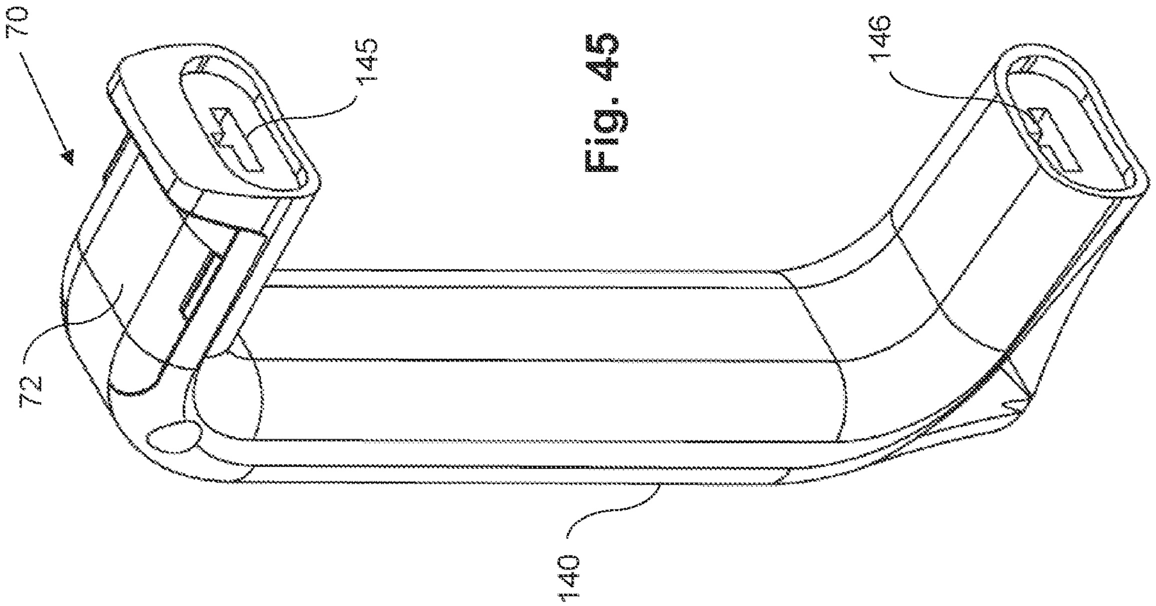
FIG. 45 is a second perspective view of the handle of the same as in FIG. 36.
Figure 44:
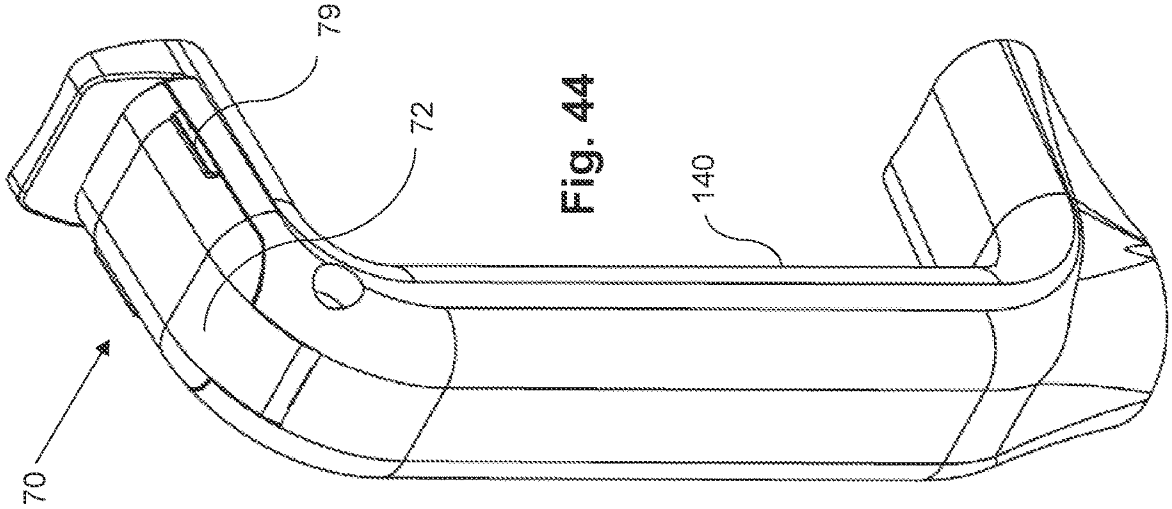
FIG. 44 is a first perspective view of the handle of the same as in FIG. 36.

As with other embodiments described above, a handle 140 equipped with the phone holder 70 may be used as a replacement handle for a conventional beverage bottle by attaching thereof using the openings 146 and 146, see FIG. 45.

Yet another phone holder 80, also built into the side handle 140, is seen in FIGS. 48-53 and is now described in greater detail. The phone holder 80 features a trigger-activated spring-loaded smartphone clamp 81 formed between two rubber inserts: a front wall insert 82 and a rear wall insert 84. The mechanism configured to move the front wall insert 82 away and towards the rear wall insert 84 so as to clamp a smartphone 10 in between thereof is not described in more detail.

Figure 51:
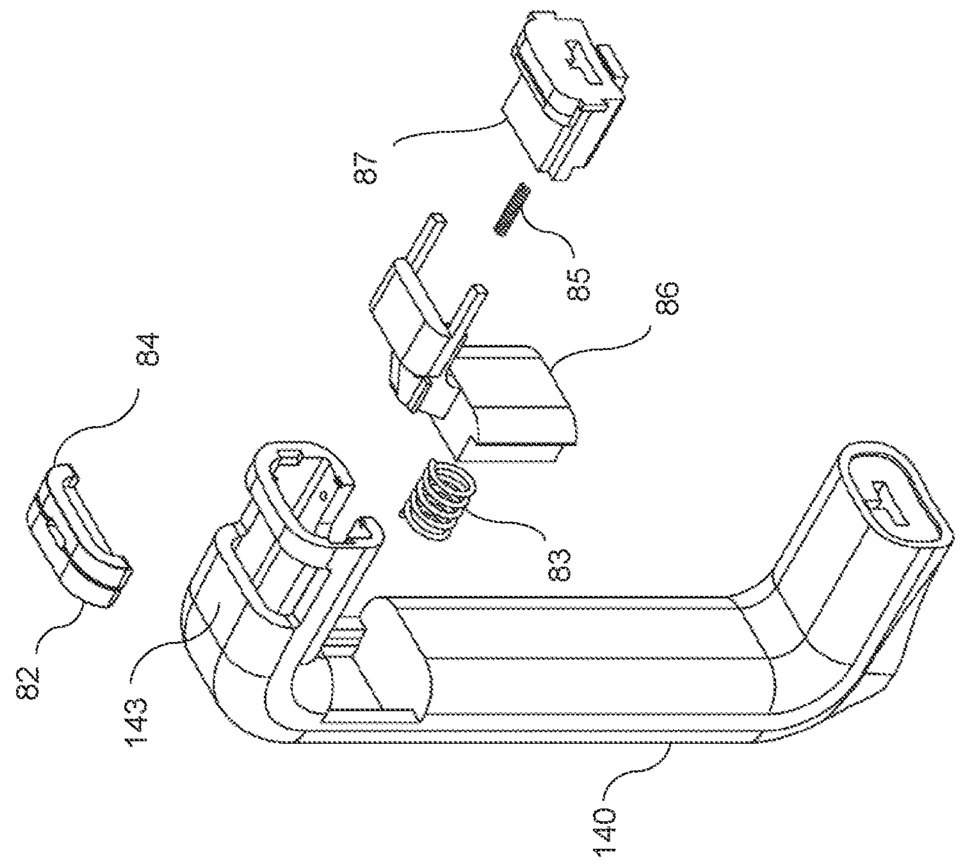
FIG. 51 is a second exploded view of the same as in FIG. 48.
Figure 50:
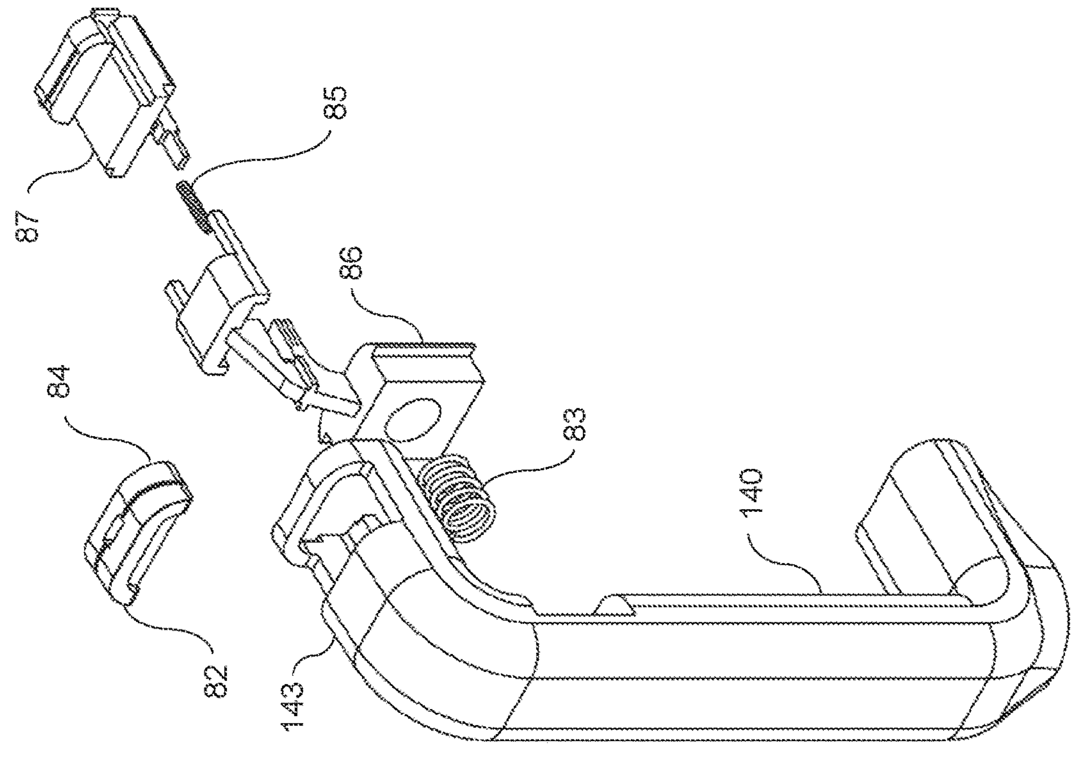
FIG. 50 is a first exploded view of the same as in FIG. 48.
Figure 52:
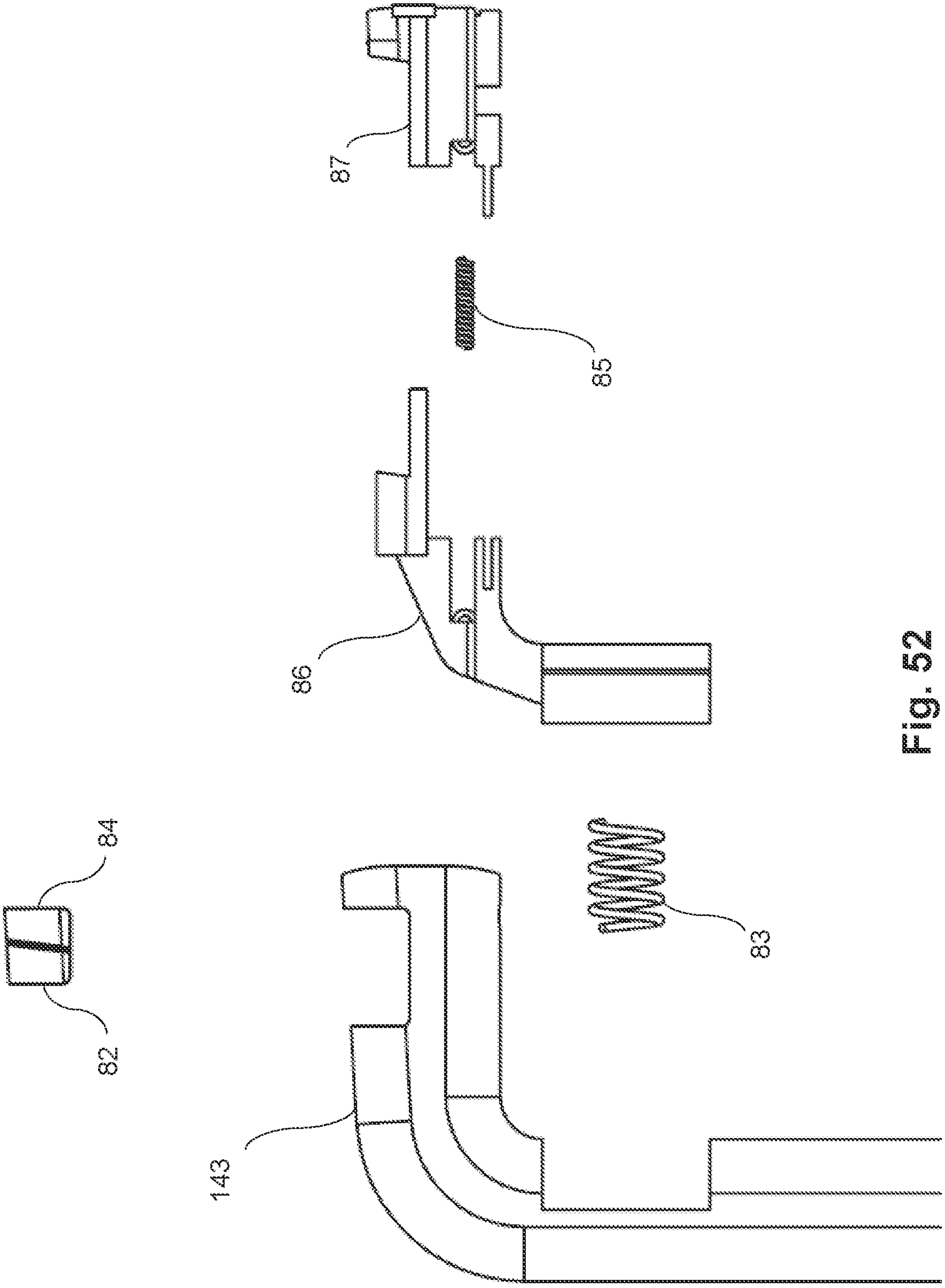
FIG. 52 is an exploded close-up side view of the same as in FIG. 48.
Figure 53:
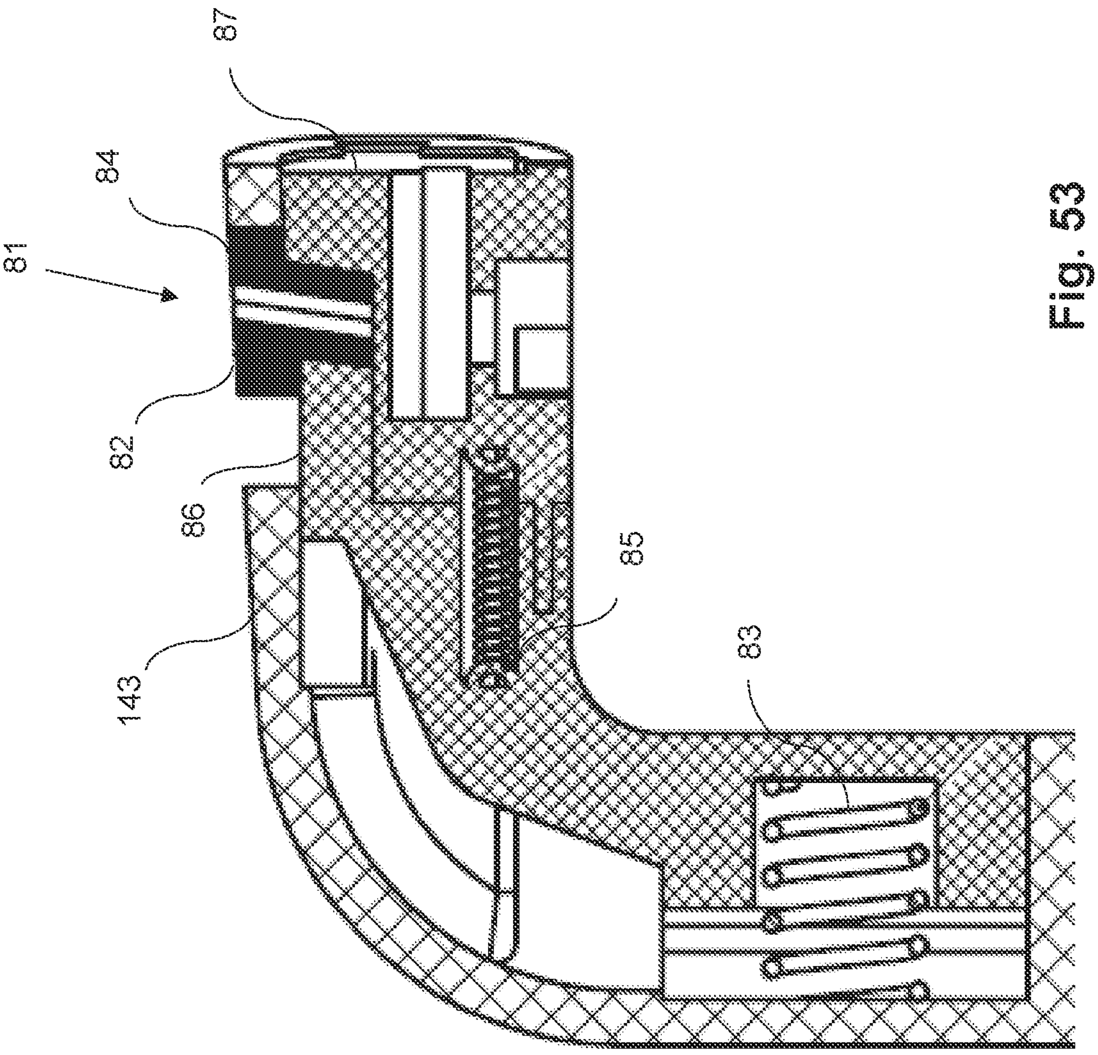
FIG. 53 is a cross-sectional close-up view of the same as in FIG. 48.
Figure 54:
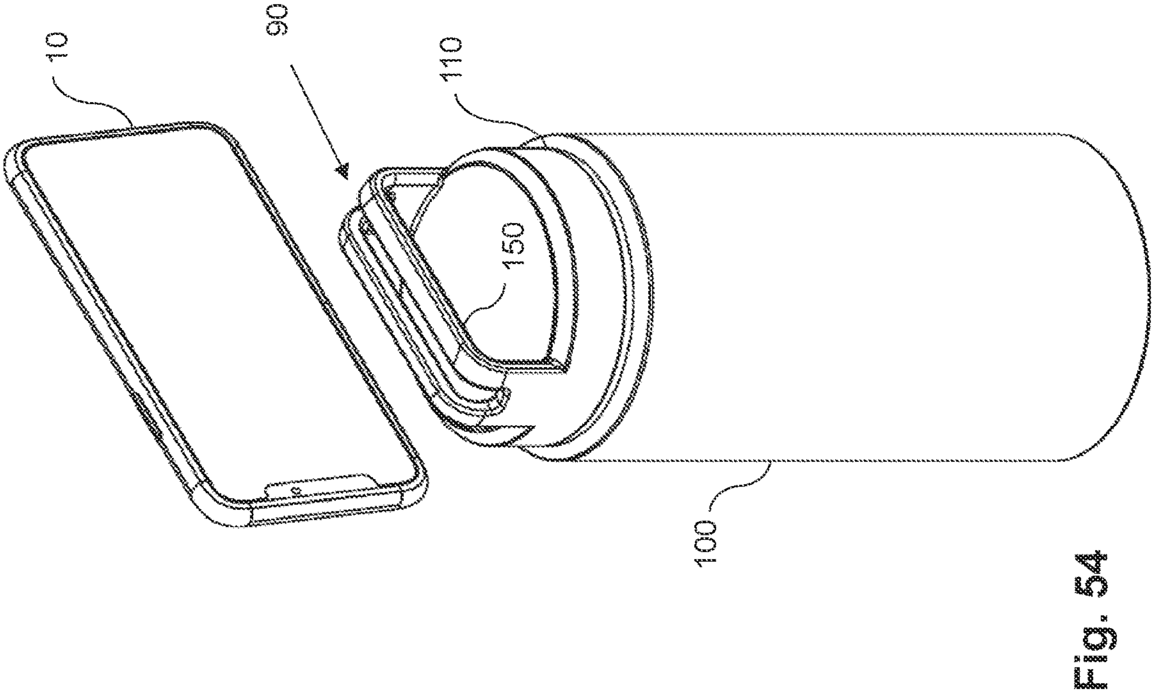
FIG. 54 is a perspective top exploded view of a further embodiment of the present invention with the phone holder incorporated into a lid handle of the beverage bottle.

Components of this mechanism are shown in greater detail in two exploded perspective views seen in FIGS. 50 and 51, a side exploded view in FIG. 52, as well as a cross-sectional side view seen in FIG. 53. The upper handle portion 143 is modified to include various recesses and cutouts to accept other parts of the mechanism of the phone holder 80. A spring-loaded trigger 86 is provided that may be inserted into a recess of the handle 140 as supported by the trigger spring 83. The trigger spring 83 pushes on the trigger 86 to urge it away from the recess in the side handle 140. The other end of the trigger 86 cooperates with the end portion 87, which in turn is fixedly assembled at the end of the upper handle portion 143 together with the rest of the side handle 140. Return spring 85 is located between the upper end of trigger 86 and the lower side of the end portion 87 and serves to return the front wall insert 82 attached to the upper end of trigger 86 to its initially closed position of touching the rear wall insert 84. The rear wall insert 84 may be fixedly attached to the end portion 87. Once the end portion 87 is assembled and attached to the upper handle portion 143, the trigger 86 is retained in between these two components and can be slidingly pulled back to open the clamp 81. Trigger spring 83 and return spring 85 may be configured to return the trigger to its original closed position.

Without the smartphone 10 positioned in the clamp 81, the entire profile of the side handle 140 equipped with the phone holder 80 is very similar to the conventional outline of the side handle of a common beverage bottle with no parts of the phone holder 80 protruding from the side handle 140 or the elongated body 100. This is one of the main advantages of this design.

In use, pulling the trigger 86 causes the front wall insert 82 attached thereto to move away from the rear wall insert 84 attached to the end portion 87 fixedly connected to the upper handle portion 143. This motion opens the gap of the clamp 81, allowing for the placement of the smartphone 10 therein. Release of the trigger 86 allows the trigger spring 83 and the return spring 85 to move the trigger 86 with the front wall insert 82 attached thereto forward and towards the rear wall insert 84. The smartphone 10 is therefore clamped and retained in the phone holder 80. A subsequent pull of the trigger 86 may be used to release the smartphone from the clamp 81 of the phone holder 80.

As with other embodiments described above, a handle 140 equipped with the phone holder 80 may be used as a replacement handle for a conventional beverage bottle by attaching thereof as discussed above.

Smartphone Holder in Lid Handle of the Beverage Bottle

Finally, a phone holder 90 incorporated with the lid handle 150 is illustrated in FIGS. 54-62 and is described in greater detail below. The phone holder 90 comprises a U-shaped channel 91, which may be made as a cut-out of the C-shaped lid handle 150 located on top of the beverage bottle of the present invention. As illustrated by a side view seen in FIG. 57 and by a side cross-sectional view seen in FIG. 62, the U-shaped channel 91 may have a front wall 92 and a rear wall 94. The rear wall 94 may be spaced apart from the front wall 92 by a supporting bottom surface 93 selected to support smartphones of various thicknesses. A part or the entire lid handle 150 may be rubberized as described above in greater detail to facilitate retention of the smartphone 10 therein. The direction of insertion of the smartphone 10 may have an inclining angle to facilitate better viewing of the smartphone by the user.

Figure 55:
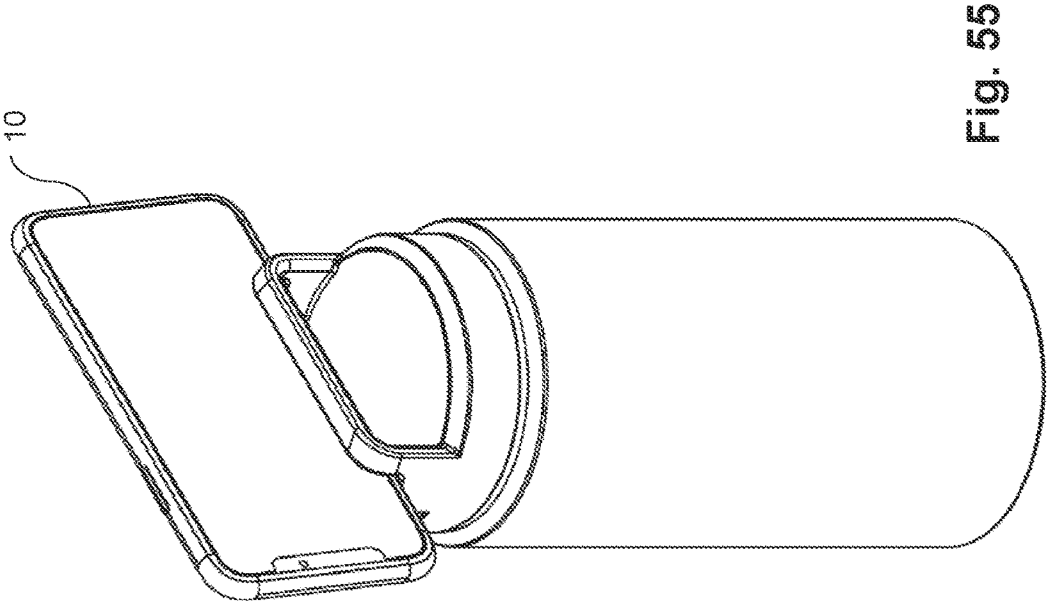
FIG. 55 is a perspective view of the same as in FIG. 54 with the smartphone supported by the phone holder.
Figure 58:
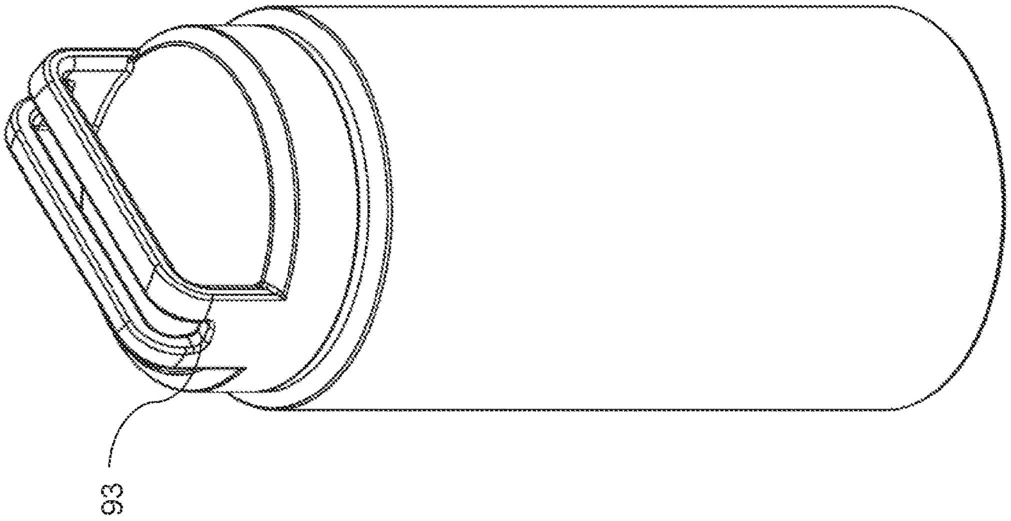
FIG. 58 is a perspective side view of the same as in FIG. 54.
Figure 57:
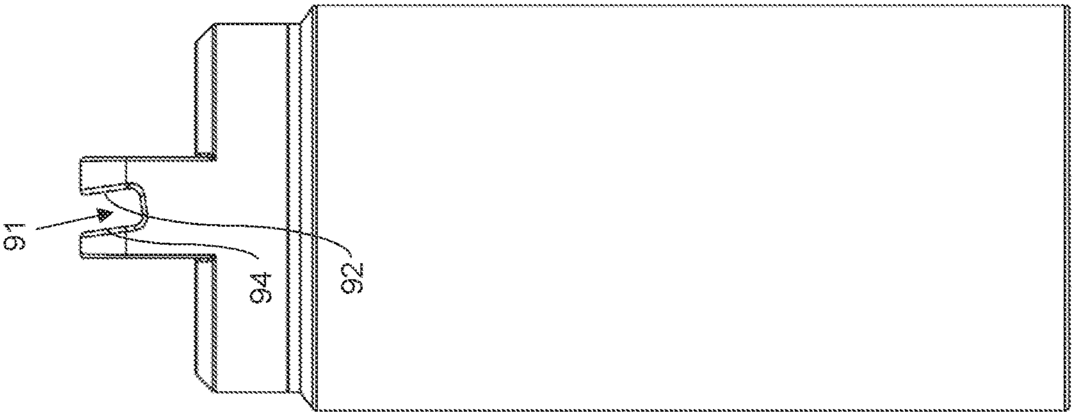
FIG. 57 is a side view of the same as in FIG. 54.
Figure 56:
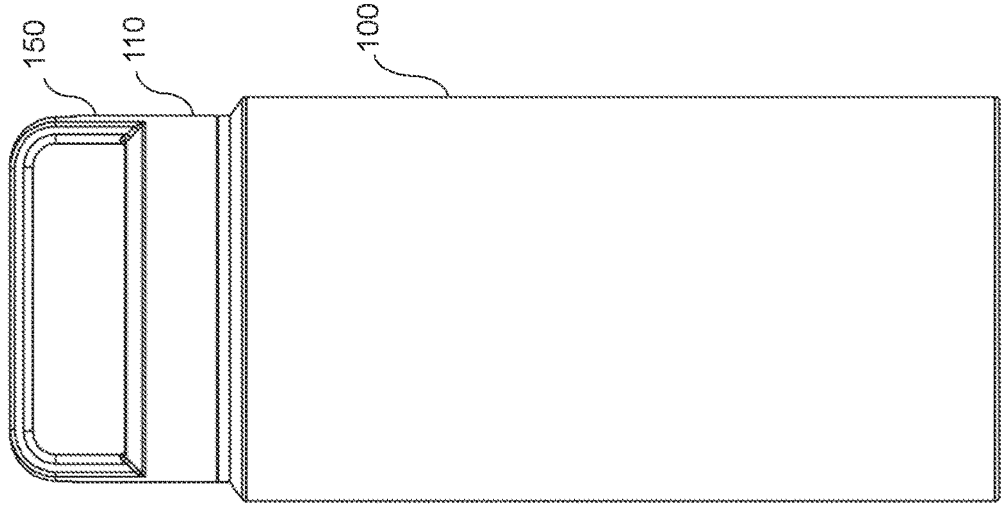
FIG. 56 is a front view of the same as in FIG. 54.
Figure 60:
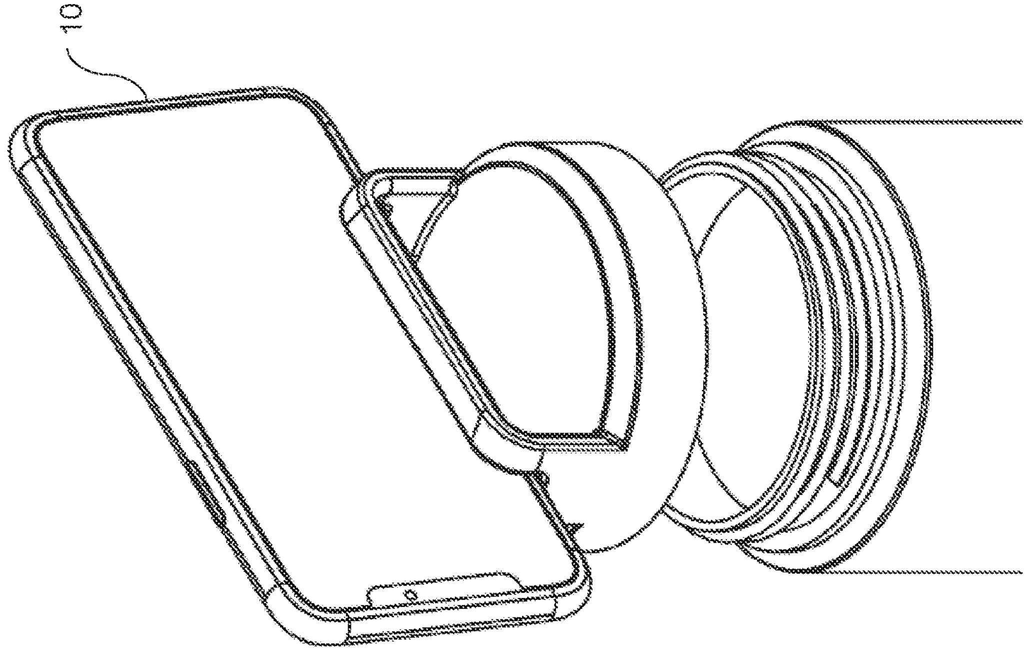
FIG. 60 is a perspective close-up side view of the same as in FIG. 54 with the smartphone supported by the phone holder of this embodiment.
Figure 59:
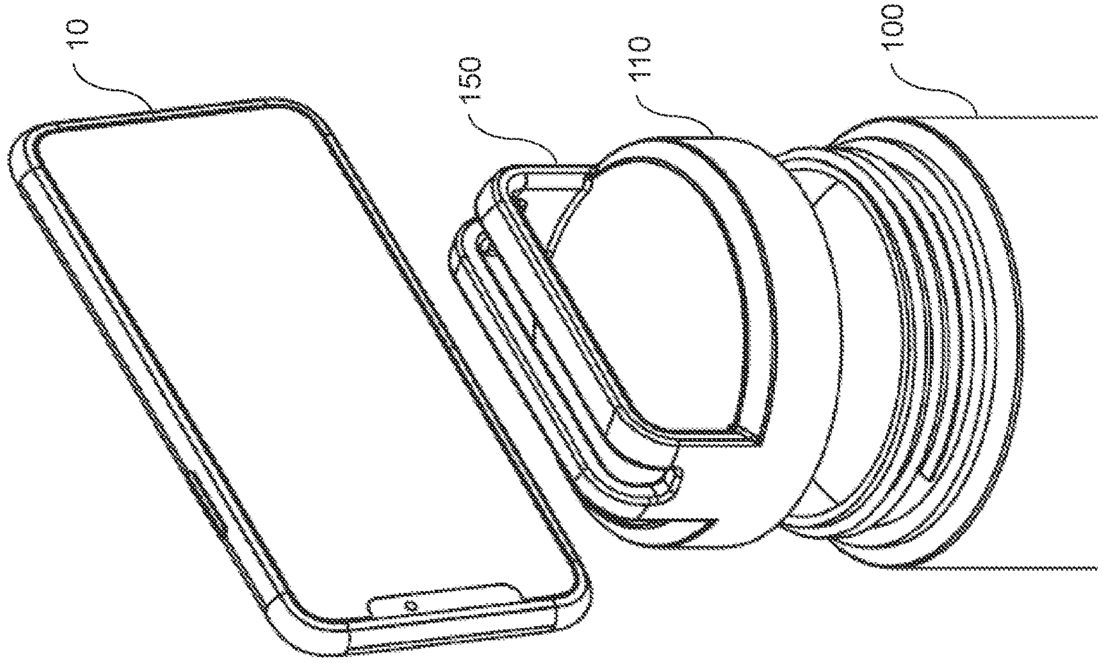
FIG. 59 is a perspective close-up view of the same as in FIG. 54.
Figure 62:
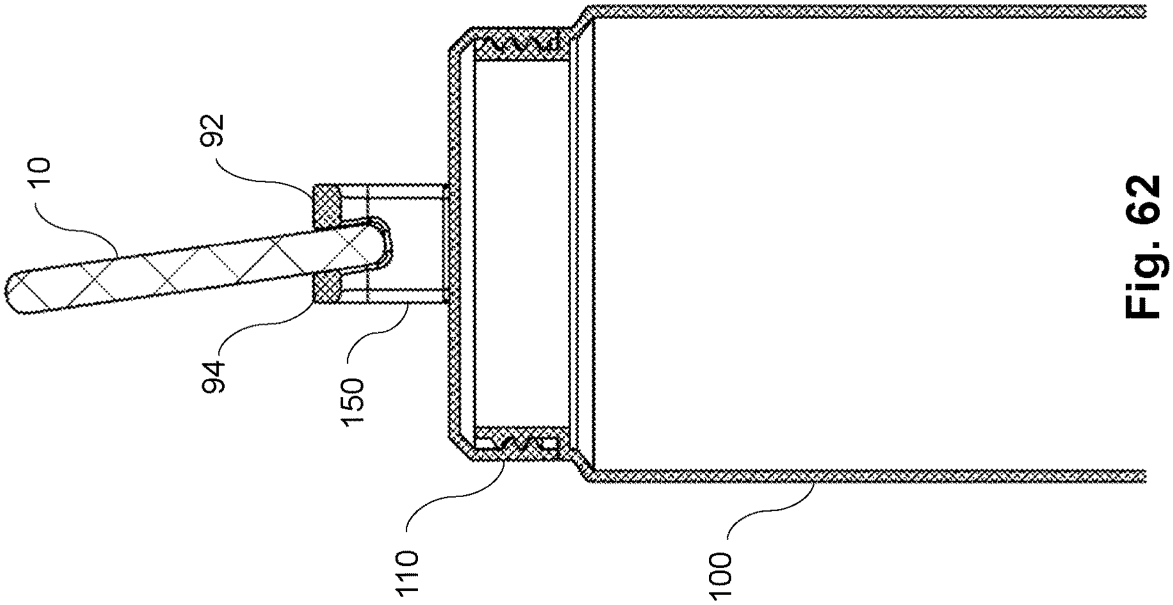
FIG. 62 is a cross-sectional close-up view of the same as in FIG. 60.
Figure 61:
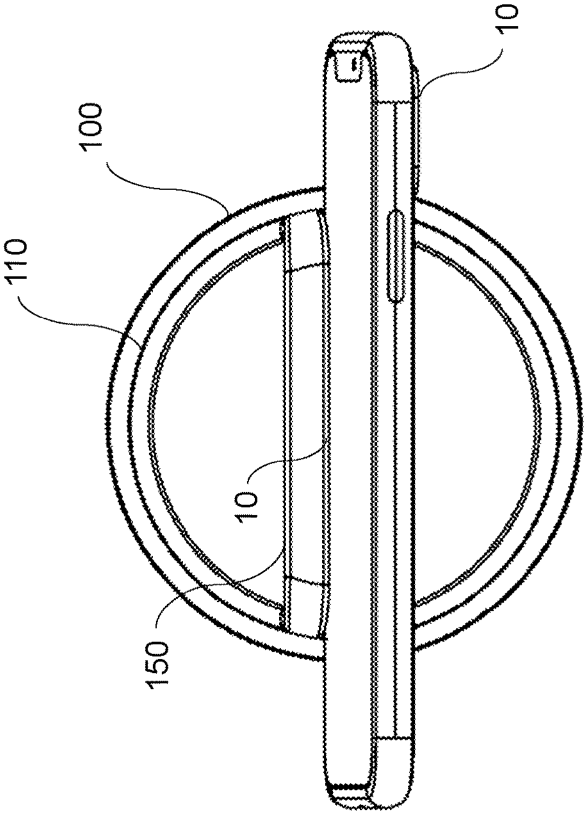
FIG. 61 is a top view of the same as in FIG. 60.

In use, the smartphone may be placed within the U-shaped channel formed by the cutout in the lid handle 150, as seen in FIGS. 55 and 60. When the lid 110 is attached to the elongated body 100, the smartphone 10 may be used in its elevated position. As an alternative, the lid 110 may be detached from the beverage bottle, as illustrated in FIG. 60, and used as a standalone phone holder.

Advantages

Holding the smartphone on top of a beverage bottle has a number of advantages compared to the prior art, as discussed below:

- Stability of the phone is improved as a heavy water bottle makes for a significant and stable phone holder base,
- The total size and weight of the phone holder are significantly reduced, as there is no longer a need for having a large and heavy base—the water bottle itself plays that role,
- Any cup holder can now be used as a phone holder by placing the water bottle in the cup holder first and then mounting the phone on top of the water bottle. This is especially advantageous in a car, which typically has a number of cup holder openings, which can all be used for holding a phone using the present invention. Another advantageous use is with many exercise machines, which typically provide one or more cup holder openings for the user,
- Using the present invention elevates the position of the phone as compared to traditional phone holders and brings it closer to an eye-level viewing experience, which is preferred as compared to having to look down constantly, as is the case with other phone holders,
- Positioning the phone at an elevated height makes it more convenient to use the smartphone for taking pictures, including taking selfies, as well as recording videos from a more natural viewpoint,
- If the phone is required to be positioned at a low height, attachment of the phone holder accessory to the flip cap of the lid allows the lid itself to be detached from the liquid container and positioned on a flat surface so as to retain the phone on top thereof close to the ground or a table surface in a stable manner.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize or be able to ascertain, using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic (s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A phone holder attached to a side handle of a beverage bottle, the phone holder comprises a U-shaped channel with a rear wall spaced away from a front wall by a bottom support surface and sized to removably accept a smartphone placed therein and facilitate a hands-free use thereof, wherein the rear wall is longer than the front wall, and both the rear wall and the front wall extend generally upward at an inclining angle to a vertical plane when the beverage bottle is positioned upright, the inclining angle being selected to position the smartphone to be inclined to provide a viewing angle to a user, wherein the side handle is generally C-shaped and defines a generally horizontal upper portion attached at one end thereof to the beverage bottle, the phone holder is incorporated with the upper portion and extends upward therefrom.

2. The phone holder of claim 1, wherein the front wall is slidingly movable across the bottom support surface toward and away from the rear wall as defined by an adjustment screw threadedly attached to a base wall extending from the bottom support surface outside the U-shaped channel.

3. The phone holder of claim 1, further comprising a bar integrally formed therewith and positioned to be parallel with and spaced apart from the bottom support surface, the upper handle portion comprises an opening sized to accept the bar of the phone holder therein, thereby retaining the phone holder at the upper handle portion of the side handle.

4. The phone holder of claim 1, wherein the phone holder comprises a spring-loaded pivot arm rotatably attached to the upper handle portion in a normally closed position, wherein pulling the pivot arm away from the upper handle portion and against a spring incorporated within the upper handle portion opens up a channel sized to accept the smartphone therein.

5. The phone holder of claim 1, wherein the phone holder comprises a spring-loaded trigger incorporated with the side handle of the beverage bottle and configured upon pulling thereon to move the front wall of the phone holder away from the rear wall thereof, thereby opening the U-shaped channel for positioning the smartphone therein.

6. The phone holder of claim 1, wherein the phone holder comprises rubberized coatings applied to at least the rear wall, front wall, or bottom support surface to reduce friction and increase retention of the smartphone placed therein.

7. The phone holder of claim 1, wherein the side handle is a replacement handle configured to be attachable to and detachable from the beverage bottle via retention screws at upper and lower mounting points, thereby enabling retrofit of existing beverage bottles with phone holder functionality.

* * * * *